US010891396B2

(12) United States Patent
Choi et al.

(10) Patent No.: US 10,891,396 B2
(45) Date of Patent: Jan. 12, 2021

(54) ELECTRONIC CIRCUIT PERFORMING ENCRYPTION/DECRYPTION OPERATION TO PREVENT SIDE- CHANNEL ANALYSIS ATTACK, AND ELECTRONIC DEVICE INCLUDING THE SAME

(71) Applicant: SAMSUNG ELECTRONICS CO., LTD., Suwon-si (KR)

(72) Inventors: Hong-Mook Choi, Bucheon-si (KR); Yun-Ho Youm, Seoul (KR); Sang-Hyun Park, Seoul (KR); Hyesoo Lee, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 396 days.

(21) Appl. No.: 15/488,639

(22) Filed: Apr. 17, 2017

(65) Prior Publication Data

US 2017/0344759 A1    Nov. 30, 2017

(30) Foreign Application Priority Data

May 27, 2016 (KR) .......................... 10-2016-0065955
Aug. 2, 2016 (KR) .......................... 10-2016-0098292

(51) Int. Cl.
*G06F 21/00* (2013.01)
*H04L 29/06* (2006.01)
(Continued)

(52) U.S. Cl.
CPC ................ *G06F 21/72* (2013.01); *G06F 1/06* (2013.01); *G09C 1/00* (2013.01); *H04L 9/003* (2013.01); *H04L 2209/12* (2013.01)

(58) Field of Classification Search
CPC ......... G06F 21/72; G06F 1/06; H04L 2209/12
See application file for complete search history.

(56) References Cited

U.S. PATENT DOCUMENTS 6,708,273 B1 * 3/2004 Ober .......................... G06F 8/60
713/189
8,750,947 B2 6/2014 Cheng et al.
(Continued)

FOREIGN PATENT DOCUMENTS

CN     103778075 A    5/2014
CN     105607688 A    5/2016
(Continued)

OTHER PUBLICATIONS

Communication dated Oct. 19, 2017, issued by the European Patent Office in counterpart European Application No. 17167183.7.
(Continued)

*Primary Examiner* — Alexander Lagor
*Assistant Examiner* — Rodman Alexander Mahmoudi
(74) *Attorney, Agent, or Firm* — Sughrue Mion, PLLC

(57) ABSTRACT

An electronic circuit includes an operator including logic gates configured to perform either one or both of encryption and decryption operations. The electronic circuit further includes a controller configured to control the operator to operate in a first mode in which each of the logic gates outputs a first logic value during a first time period of a clock signal, and operate in a second mode in which a number of first logic gates, each of which outputs the first logic value, among the logic gates, and a number of second logic gates, each of which outputs a second logic value, among the logic gates, are maintained constant during a second time period of the clock signal, in response to a control value indicating that either one or both of the encryption and decryption operations are performed.

20 Claims, 20 Drawing Sheets

(51) Int. Cl.
  *G06F 21/72* (2013.01)
  *H04L 9/00* (2006.01)
  *G09C 1/00* (2006.01)
  *G06F 1/06* (2006.01)

(56) References Cited

U.S. PATENT DOCUMENTS

| | | | |
|---|---|---|---|
| 8,904,192 B2 | 12/2014 | Danger et al. | |
| 8,955,160 B2 | 2/2015 | Danger et al. | |
| 9,240,786 B2 | 1/2016 | Tanimura et al. | |
| 9,323,952 B2* | 4/2016 | Binesse | G09C 1/10 |
| 9,344,273 B2 | 5/2016 | Choi et al. | |
| 9,612,609 B2 | 4/2017 | Weiner | |
| 9,785,784 B2 | 10/2017 | Kim et al. | |
| 2003/0169073 A1* | 9/2003 | Takiba | G06F 13/4027 |
| | | | 326/86 |
| 2004/0070419 A1* | 4/2004 | Hirano | G01R 31/3185 |
| | | | 326/16 |
| 2005/0055596 A1 | 3/2005 | Abe et al. | |
| 2008/0265968 A1* | 10/2008 | Furuichi | G06F 1/08 |
| | | | 327/299 |
| 2010/0107025 A1* | 4/2010 | Sakada | G01R 31/005 |
| | | | 714/733 |
| 2011/0129085 A1 | 6/2011 | Choi et al. | |
| 2011/0167279 A1 | 7/2011 | Danger et al. | |
| 2012/0124680 A1 | 5/2012 | Danger et al. | |
| 2013/0238931 A1* | 9/2013 | Suzuki | G06F 11/1068 |
| | | | 714/15 |
| 2013/0293259 A1 | 11/2013 | Tanimura et al. | |
| 2014/0115656 A1 | 4/2014 | Kim et al. | |
| 2014/0266414 A1* | 9/2014 | Kim | G05F 1/468 |
| | | | 327/543 |
| 2015/0254476 A1 | 9/2015 | Lee et al. | |
| 2016/0112194 A1 | 4/2016 | Choi et al. | |
| 2016/0183340 A1* | 6/2016 | Lee | H05B 33/0809 |
| | | | 315/186 |

FOREIGN PATENT DOCUMENTS

| | | |
|---|---|---|
| FR | 2980657 A1 | 3/2013 |
| JP | 2013143652 A | 7/2013 |
| JP | 2013143653 A | 7/2013 |
| KR | 1020150103935 A | 9/2015 |
| KR | 101646705 A | 8/2016 |
| TW | 201330576 A1 | 7/2013 |

OTHER PUBLICATIONS

Marzouqi Hamad et al: "Review of gate-level differential power analysis and fault analysis countermeasures", IET Inf. Secur.,Jan. 1, 2014, vol. 8, No. 1, pp. 51-66, XP006047553, (16 pages total).

Mohit Arora: "Clocks and Resets" In: "The Art of Hardware Architecture. Design Methods and Techniques for Digital Circuits", Jul. 15, 2011, pp. 11-49, XP055414422 (40 pages total).

* cited by examiner

| CLK1 | A | B | AND1 | AND2 | AND3 | OR1 | OR2 | OR3 | the number of gates outputting "1" | Period |
|---|---|---|---|---|---|---|---|---|---|---|
| 0 | - | - | 0 | 0 | 0 | 0 | 0 | 0 | 0 | Initialization |
| 1 | 0 | 0 | 0 | 0 | 1 | 1 | 1 | 0 | AND:1, OR:2 | Operation |
| 1 | 0 | 1 | 1 | 0 | 0 | 0 | 1 | 1 | AND:1, OR:2 | |
| 1 | 1 | 0 | 0 | 1 | 0 | 1 | 0 | 1 | AND:1, OR:2 | |
| 1 | 1 | 1 | 0 | 0 | 1 | 1 | 1 | 0 | AND:1, OR:2 | |

ELECTRONIC CIRCUIT PERFORMING ENCRYPTION/DECRYPTION OPERATION TO PREVENT SIDE-CHANNEL ANALYSIS ATTACK, AND ELECTRONIC DEVICE INCLUDING THE SAME

CROSS-REFERENCE TO RELATED APPLICATIONS

This application claims priority from Korean Patent Application No. 10-2016-0065955, filed on May 27, 2016, and Korean Patent Application No. 10-2016-0098292, filed on Aug. 2, 2016, in the Korean Intellectual Property Office, the entire disclosures of which are incorporated herein by reference in their entireties.

BACKGROUND

1. Field

Apparatuses consistent with example embodiments relate to an electronic circuit and an electronic device, and in particular, relates to configurations and operations of an electronic circuit and an electronic device that perform an encryption/decryption operation.

2. Description of Related Art

Nowadays, various kinds of electronic devices are being used. The electronic device performs one's own function(s) based on operations of one or more electronic circuits included therein. An operation of the electronic device is performed as data of an electronic form is input to an electronic circuit or is output therefrom.

The input or output data may be exposed to an entity that is external to the electronic device. For example, with regard to the electronic device, an attacker (e.g., a hacker) may obtain the authority to control the electronic device by manipulating data that is being input to the electronic device. For example, the attacker may manipulate data output from the electronic device to change the data arbitrarily or to damage security attributes of the data. In such examples, security levels and reliability of the electronic device and the electronic circuit may be greatly degraded.

For this reason, the electronic device may include an encryption/decryption circuit to encrypt input or output data and to decrypt the encrypted data. The encryption/decryption circuit may encrypt/decrypt data by using a key, according to an encryption/decryption algorithm. When the key is unknown, it may be difficult for the attacker to find a key based on only input/output data. Accordingly, it may also be difficult for the attacker to find an original version of the encrypted data. Therefore, the encryption/decryption operation may improve the security levels and reliability of the electronic device and the electronic circuit.

However, some encryption/decryption circuits may be still attacked by the attacker. The attacker may conduct "side-channel analysis attack" instead of directly manipulating input or output data. In the side-channel analysis attack, the attacker may collect side information such as, but not limited to, the amount of power consumed by the encryption/decryption circuit, waveforms of electromagnetic waves generated by the encryption/decryption circuit, and/or the like. The attacker may attack the encryption/decryption circuit to find a key used in the encryption/decryption circuit, based on the collected information.

SUMMARY

According to example embodiments, an electronic circuit includes an operator including logic gates configured to perform either one or both of encryption and decryption operations, and a controller configured to control the operator to operate in a first mode in which each of the logic gates outputs a first logic value during a first time period of a clock signal, and operate in a second mode in which a number of first logic gates, each of which outputs the first logic value, among the logic gates, and a number of second logic gates, each of which outputs a second logic value, among the logic gates, are maintained constant during a second time period of the clock signal, in response to a control value indicating that either one or both of the encryption and decryption operations are performed, and control the operator to operate in the first mode or the second mode, in response to the control value indicating that either one or both of the encryption and decryption operations are not performed.

According to example embodiments, an electronic circuit includes an operator including logic gates, an encryption or decryption controller configured to output a control value indicating whether either one or both of encryption and decryption operations are performed by the operator, and a period controller configured to generate an activation signal, based on the control value and a clock signal. The operator is further configured to operate in a first mode in which each of the logic gates outputs a first logic value during a first time period, in response to a deactivation value of the activation signal, and operate in a second mode in which a number of first logic gates, each of which outputs the first logic value, among the logic gates, and a number of second logic gates, each of which outputs a second logic value, among the logic gates, are maintained constant during a second time period, in response to an activation value of the activation signal.

According to example embodiments, an electronic device includes a data input and output device, an encryption and decryption circuit configured to perform encryption and decryption operations for the data input and output device, and a period controller configured to generate an activation signal, based on a clock signal and a control value indicating whether the encryption and decryption operations are performed. Outputs from the encryption and decryption circuit are not changed, and an amount of power that is consumed by the encryption and decryption circuit is maintained constant, in response to the control value indicating that the encryption and decryption operations are not performed and the activation signal having a deactivation value or an activation value.

According to example embodiments, an electronic circuit includes an operator including logic gates configured to operate based on a clock signal, and a controller configured to control the operator, such that output values from the logic gates are not changed in response to a first logic value of the clock signal, and a number of first logic gates, each of which outputs the first logic value, among the logic gates, and a number of second logic gates, each of which outputs a second logic value, among the logic gates, are maintained constant in response to the second logic value of the clock signal. A length of a first time period in which the clock signal has the first logic value is shorter than a length of a second time period in which the clock signal has the second logic value.

According to example embodiments, an electronic circuit includes a clock controller configured to, based on a first clock signal, generate a second clock signal, and an operator including logic gates configured to operate based on the second clock signal. A length of a first time period in which the first clock signal has a first logic value is identical to a length of a second time period in which the first clock signal has a second logic value, a length of a third time period in which the second clock signal has the first logic value is shorter than a length of a fourth time period in which the second clock signal has the second logic value, output values from the logic gates are not changed in response to the first logic value of the second clock signal, and a number of first logic gates, each of which outputs the first logic value, among the logic gates, and a number of second logic gates, each of which outputs the second logic value, among the logic gates, are maintained constant in response to the second logic value of the second clock signal.

According to example embodiments, an electronic device includes a data input and output device, a clock controller configured to generate a clock signal, and an encryption and decryption circuit configured to perform encryption and decryption operations for the data input and output device, based on the clock signal. A length of a first time period in which the clock signal has a first logic value is shorter than a length of a second time period in which the clock signal has a second logic value, output values from the encryption and decryption circuit are not changed in response to the first logic value of the clock signal, and an amount of power that is consumed by the encryption and decryption circuit is maintained constant in response to the second logic value of the clock signal.

According to example embodiments, an electronic circuit includes logic gates configured to perform either one or both of encryption and decryption, the logic gates being configured to operate in an initialization mode in which each of the logic gates outputs a first logic value in response to the first logic value of an input signal, and operate in an operation mode in which a number of first logic gates, each of which outputs the first logic value, among the logic gates, and a number of second logic gates, each of which outputs a second logic value, among the logic gates, are maintained constant in response to the second logic value of the input signal.

DETAILED DESCRIPTION

Figure 1:
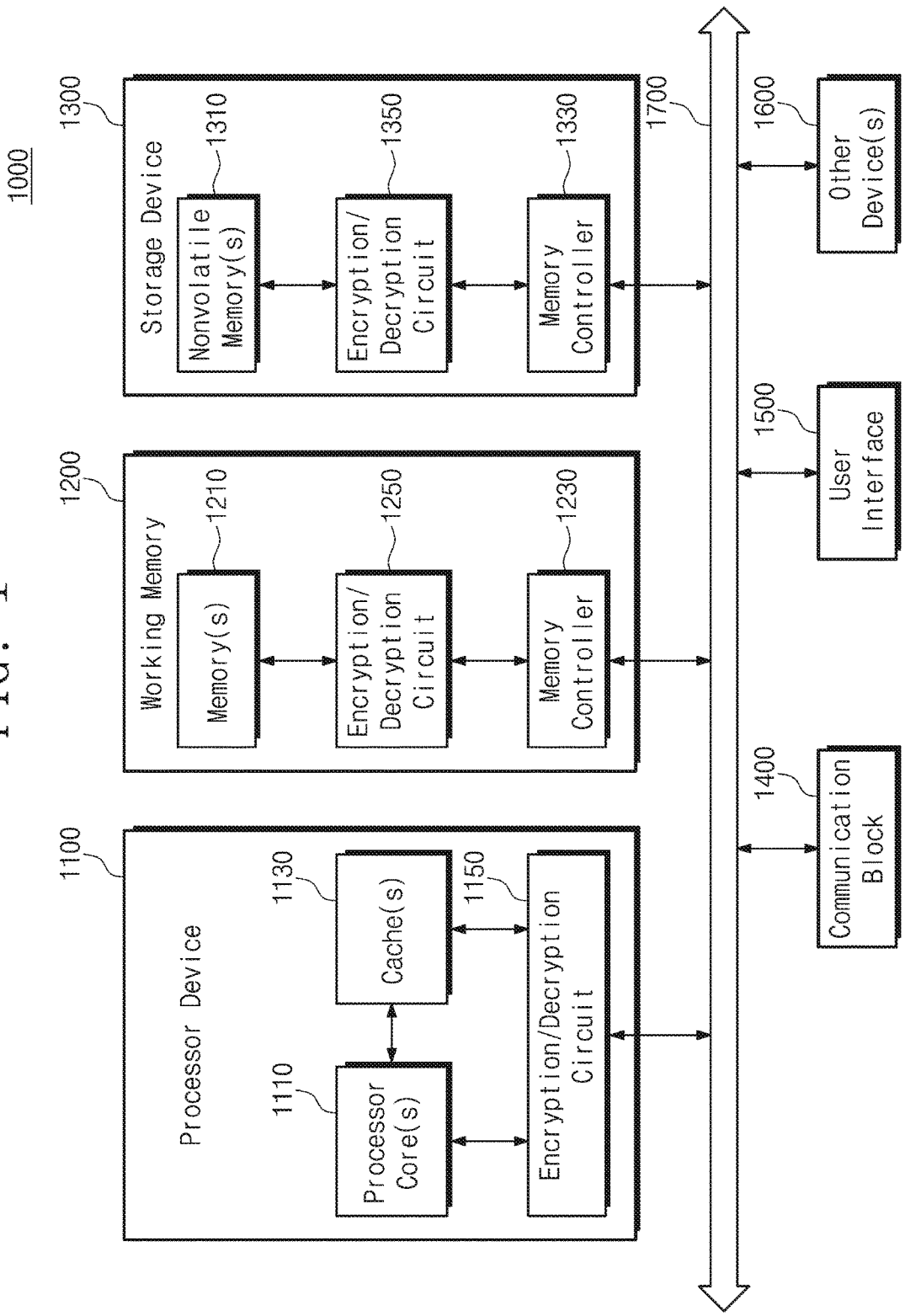
FIG. 1 is a block diagram illustrating a computing device that includes electronic devices each adopting an encryption/decryption circuit, according to example embodiments.

FIG. 1 is a block diagram illustrating a computing device that includes electronic devices each adopting an encryption/decryption circuit, according to example embodiments. In example embodiments, a computing device 1000 may include a processor device 1100, a working memory 1200, a storage device 1300, a communication block 1400, a user interface 1500, any other device(s) 1600, and a bus 1700.

For example, the computing device 1000 may be one of various electronic devices such as, but not limited to, a desktop computer, a laptop computer, a tablet computer, a workstation, a server, a digital television, a video game console, a smart phone, a wearable device, and/or the like.

The processor device 1100 may control overall operations of the computing device 1000. The processor device 1100 may be configured to process various kinds of arithmetic operations and/or logic operations. To this end, the processor device 1100 may include a special-purpose logic circuit (e.g., a field programmable gate array (FPGA), application specific integrated chips (ASICs), and/or the like) including one or more processor cores 1110. For example, the processor device 1100 may include a general-purpose processor, a special-purpose processor, and/or an application processor.

For example, the processor device 1100 may execute an instruction set of a program code by using the processor cores 1110. One or more caches 1130 may temporarily store data generated by executing the instruction set or data to be used for executing the instruction set.

The working memory 1200 may temporarily store data used in an operation of the computing device 1000. For example, the working memory 1200 may store data processed or to be processed by the processor device 1100, in one or more memories 1210. For example, the memories 1210 may include volatile memories such as, but not limited to, a static random access memory (SRAM), a dynamic RAM (DRAM), a synchronous DRAM (SDRAM), and/or the like. A memory controller 1230 may control the memories 1210 such that the memories 1210 store data or output the stored data.

The storage device 1300 may store data regardless of whether power is supplied. The storage device 1300 may store system data used to operate the computing device 1000 and/or user data for a user of the computing device 1000, in one or more nonvolatile memories 1310. For example, the nonvolatile memories 1310 may include any one or any combination of various nonvolatile memories such as, but not limited to, a flash memory, a phase-change RAM (PRAM), a magneto-resistive RAM (MRAM), a resistive RAM (ReRAM), a ferro-electric RAM (FRAM), and/or the like. A memory controller 1330 may control the nonvolatile memories 1310 such that the nonvolatile memories 1310 store data or output the stored data. For example, the storage device 1300 may include storage mediums such as, but not limited to, a solid state drive (SSD), a hard disk drive (HDD), a secure digital (SD) card, a multimedia card (MMC), and/or the like.

The communication block 1400 may communicate with an external device/system of the computing device 1000 under control of the processor device 1100. For example, the communication block 1400 may communicate with the external device/system of the computing device 1000 based on any one or any combination of various wired communication protocols, such as an Ethernet, a transfer control protocol/Internet protocol (TCP/IP), a universal serial bus (USB), Firewire, and/or the like, and/or any one or any combination of various wireless communication protocols, such as long term evolution (LTE), worldwide interoperability for microwave access (WiMax), global system for mobile communications (GSM), code division multiple access (CDMA), Bluetooth, near field communication (NFC), wireless-fidelity (Wi-Fi), radio frequency identification (RFID), and/or the like.

The user interface 1500 may arbitrate communication between a user and the computing device 1000 under control of the processor device 1100. For example, the user interface 1500 may process inputs from a keyboard, a mouse, a keypad, a button, a touch panel, a touch screen, a touch pad, a touch ball, a camera, a microphone, a gyroscope sensor, a vibration sensor, etc. In addition, the user interface 1500 may process outputs that are to be provided to a display device, a speaker, a motor, etc.

Besides, the computing device 1000 may further include any other device 1600. For example, the other device 1600 may include various peripheral devices such as an image sensor, a graphics processing unit, a sound processor, a global positioning system (GPS) device, and/or the like.

Each of the processor device 1100, the working memory 1200, the storage device 1300, the communication block 1400, the user interface 1500, and the other device 1600 may be implemented in a device of a chip level and/or a device of a package level, to be mounted to the computing device 1000. Alternatively, each of the processor device 1100, the working memory 1200, the storage device 1300, the communication block 1400, the user interface 1500, and the other device 1600 may be implemented in an independent electronic device, to be assembled in the computing device 1000. The mounted or assembled components may be connected to each other through the bus 1700.

The bus 1700 may provide a communication path between components of the computing device 1000. The components of the computing device 1000 may exchange data with each other based on a bus format of the bus 1700. For example, the bus format may include one or more of various communication protocols, such as peripheral component interconnect express (PCIe), nonvolatile memory express (NVMe), small computer system interface (SCSI), advanced technology attachment (ATA), serial ATA (SATA), parallel ATA (PATA), serial attached SCSI (SAS), universal flash storage (UFS), and/or the like.

As the computing device 1000 operates, data may be input to components of the computing device 1000 or may output therefrom. Each of the components of the computing device 1000 may be referred to as a "data input/output device".

Input or output data may be exposed to an entity that is external to the computing device 1000. For example, with regard to the computing device 1000, an attacker (e.g., a hacker) may obtain the authority to control the computing device 1000 and the processor device 1100 by manipulating data that is input to the processor device 1100. For example, the attacker may obtain the authority to control the processor device 1100 to interrupt an operation of the computing device 1000 or to operate the computing device 1000 maliciously.

For example, the attacker may manipulate data stored in the working memory 1200 and/or the storage device 1300 to change data arbitrarily or to damage security attributes of the data. For example, the attacker may insert a malicious code into data stored in the working memory 1200 or may crack a password for an access to data stored in the storage device 1300 or digital right management (DRM) attributes of the data. In such examples, security levels and reliability of the computing device 1000 and components thereof may be greatly degraded.

For this reason, each of the components of the computing device 1000 may include an encryption/decryption circuit to encrypt input or output data and decrypt the encrypted data. The encryption/decryption circuit may perform encryption and decryption operations for a data input/output device. In the encryption and decryption operations, the encryption/decryption circuit may encrypt/decrypt data by using a key, according to an encryption/decryption algorithm. When the key is unknown, it may be difficult for the attacker to find a key based on only input/output data. Accordingly, it may also be difficult for the attacker to find an original version of the encrypted data. Therefore, the encryption and decryption operations may improve the security levels and reliability of an electronic device and an electronic circuit.

For example, the processor device 1100 may encrypt data output from the processor cores 1110 and/or the caches 1130 by using an encryption/decryption circuit 1150. In addition, the processor device 1100 may decrypt data to be input to the processor cores 1110 and/or the caches 1130 by using the encryption/decryption circuit 1150. It may be difficult for the attacker to understand and analyze data transformed according to the encryption and decryption operations. Thus, it may be possible to protect the authority to control the processor device 1100.

For example, the working memory 1200 may encrypt data to be stored in the memories 1210 by using an encryption/decryption circuit 1250. In addition, the working memory 1200 may decrypt data output from the memories 1210 by using the encryption/decryption circuit 1250. Similarly, the storage device 1300 may encrypt data to be stored in the nonvolatile memories 1310 by using an encryption/decryption circuit 1350. Also, the storage device 1300 may decrypt data output from the nonvolatile memories 1310 by using the encryption/decryption circuit 1350. Accordingly, it may be difficult for the attacker to change or damage data stored in the memories 1210 and/or the nonvolatile memories 1310 arbitrarily, and thus data stored therein may be safely protected.

The encryption/decryption circuits 1150, 1250, and 1350 are illustrated in FIG. 1 as being included in the data input/output devices 1100, 1200, and 1300, respectively. However, in example embodiments, the encryption/decryption circuits 1150, 1250, and 1350 may be implemented separately from the data input/output devices 1100, 1200, and 1300. In addition to the data input/output devices 1100, 1200, and 1300, each of any other devices (e.g., 1400, 1500, and 1600) and the bus 1700 may employ an encryption/decryption circuit. The encryption/decryption circuit may be employed even at any path through which data are input or output. FIG. 1 is provided to facilitate better understanding without limiting the example embodiments.

Below, some example configurations and operations of the encryption/decryption circuit 1350 will be described with reference to FIGS. 2 to 24. However, configurations and operations of any other non-illustrated encryption/decryption circuits as well as the encryption/decryption circuits 1150 and 1250 may be also implemented according to the example embodiments to be described below. The following example embodiments are provided to facilitate better understanding without limiting the example embodiments.

Figure 2:
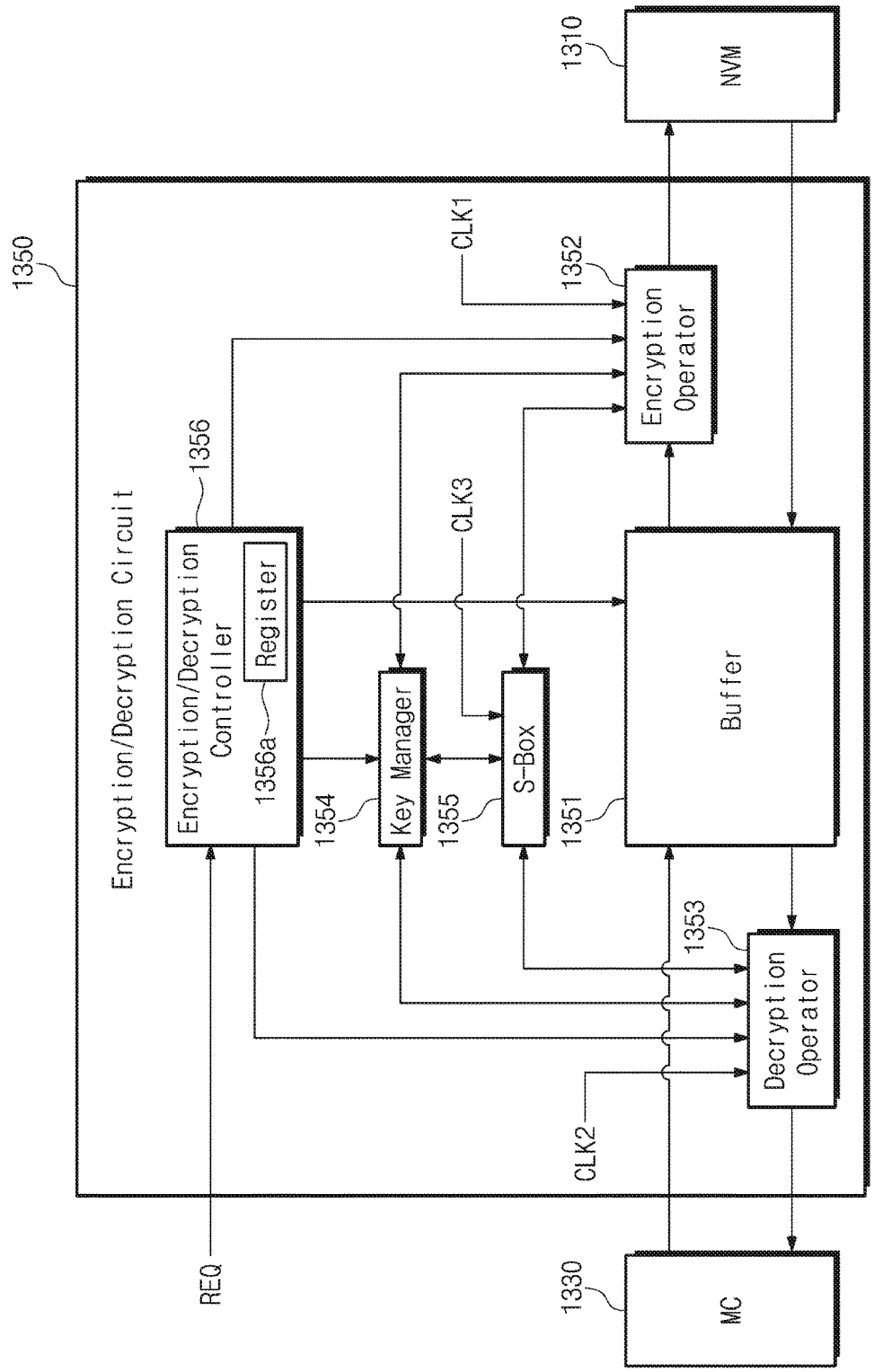
FIG. 2 is a block diagram illustrating an example configuration of an encryption/decryption circuit of FIG. 1.

FIG. 2 is a block diagram illustrating an example configuration of an encryption/decryption circuit of FIG. 1. As illustrated in FIGS. 1 and 2, the encryption/decryption circuit 1350 may be connected with the nonvolatile memories (NVM) 1310 and the memory controller (MC) 1330 in the storage device 1300. In this specification, the encryption/decryption circuit 1350 for the nonvolatile memories 1310 is described, but the encryption/decryption circuit 1350 may also be applied to a volatile memory (e.g., a buffer memory, a cache memory, and/or the like) included in the storage device 1300.

In example embodiments, the encryption/decryption circuit 1350 may include a buffer 1351, an encryption operator 1352, a decryption operator 1353, a key manager 1354, a substitution-box (S-Box) 1355, and an encryption/decryption controller 1356. However, in example embodiments, the encryption/decryption circuit 1350 may not include some of components illustrated in FIG. 2 or may further include component(s) that are not illustrated in FIG. 2.

The buffer 1351 may temporarily store (e.g., buffer) data provided from the nonvolatile memories 1310 and the memory controller 1330. Data buffered by the buffer 1351 may be provided to the encryption operator 1352 or the decryption operator 1353. That is, the buffer 1351 may store data on which the encryption operation and/or the decryption operation are to be performed.

The encryption operator 1352 may perform the encryption operation on data to be stored in the nonvolatile memories 1310. Accordingly, a security level of data to be stored in the nonvolatile memories 1310 may be improved. The decryption operator 1353 may perform the decryption operation on data read from the nonvolatile memories 1310. Accordingly, the memory controller 1330 may receive the decrypted data.

Some of encryption and decryption operations may be performed using a "key". For example, some encryption and decryption operations may include performing a combinational logic operation (e.g., a logical OR operation, a logical AND operation, an exclusive OR operation, and/or the like) on given data and a given key. The key may be unknown to an external entity, and may be uniquely selected in the encryption/decryption circuit 1350. Accordingly, the encryption and decryption operations may protect data from an external attack of the attacker.

The key manager 1354 may manage a key used for the encryption and decryption operations. The key manager 1354 may include a memory for storing a key, and/or may access a key stored in any other memory.

As will be described with reference to FIG. 3, the encryption operation (and/or the decryption operation) may be repeated many times, not once, to increase a security level. Performing the encryption operation (and/or the decryption operation) once may be referred to as a "round". The number of times that the encryption operation (and/or the decryption operation) is repeated may be managed based on a "round value". For example, different keys may be selected for respective rounds. For example, a key that is selected for a first round may be different from a key that is selected for a second round.

The key manager 1354 may manage a plurality of keys. The key manager 1354 may schedule a key to be selected in each round among the plurality of keys. The key manager 1354 may provide a scheduled key to the encryption operator 1352 and/or the decryption operator 1353 in response to requests of the encryption operator 1352 and/or the decryption operator 1353.

The S-Box 1355 may perform a substitution operation. In the substitution operation, the S-Box 1355 may convert an m-bit input into an n-bit output, each of "m" and "n" is an integer that is equal to or more than one (1), and "m" and "n" are the same as or different from each other. For example, the substitution operation of the S-Box 1355 may be performed based on a look-up table that includes a correspondence relationship between the m-bit input and the n-bit output.

For example, the encryption operator 1352 and the decryption operator 1353 may perform the encryption operation and the decryption operation on data substituted by the S-Box 1355, instead of directly performing the encryption operation and the decryption operation on data received from the buffer 1351. For the encryption operator 1352 and the decryption operator 1353, the S-Box 1355 may convert data buffered by the buffer 1351 into other different data. Because the S-Box 1355 changes data on which the encryption and decryption operations are to be performed, the security level of data may be further improved.

In some cases, the S-Box 1355 may perform the substitution operation on a key selected by the key manager 1354. When both data and a key are changed, the encryption and decryption operations may be protect data more safely.

Each of the encryption operator 1352, the decryption operator 1353, and the S-Box 1355 may include a plurality of logic gates. The encryption operator 1352, the decryption operator 1353, and the S-Box 1355 may respectively perform the encryption operation, the decryption operation, and the substitution operation by using the plurality of logic gates.

The logic gates of the encryption operator 1352 may operate based on a clock signal CLK1 to perform the encryption operation. The logic gates of the decryption operator 1353 may operate based on a clock signal CLK2 to perform the decryption operation. The logic gates of the S-Box operator 1355 may operate based on a clock signal CLK3 to perform the substitution operation. Each of the clock signals CLK1, CLK2, and CLK3 may mean a signal that is formed with rising edge(s) and falling edge(s) to have a first logic value (e.g., logic "0") and a second logic value (e.g., logic "1").

For example, each of the clock signals CLK1, CLK2, and CLK3 may be provided from a clock generator located inside or outside of the encryption/decryption circuit 1350. For example, the storage device 1300 and/or the computing device 1000 may include clock generator(s) that generates the clock signals CLK1, CLK2, and CLK3. For example, the clock signals CLK1, CLK2, and CLK3 may be provided from separate clock generators or from one clock generator.

FIG. 2 illustrates that the encryption operator 1352, the decryption operator 1353, and the S-Box 1355 receive the separate clock signals CLK1, CLK2, and CLK3, respectively. However, in example embodiments, all or some of the encryption operator 1352, the decryption operator 1353, and the S-Box 1355 may share the same clock signal.

When the encryption operator 1352 is implemented separately from the decryption operator 1353, the encryption operation and the decryption operation may be performed in parallel with each other, thereby improving the performance of the encryption/decryption circuit 1350. In some cases, the encryption operator 1352 and the decryption operator 1353 may be implemented in one single apparatus, and thus the area of the encryption/decryption circuit 1350 may decrease. In some cases, the encryption/decryption circuit 1350 may include a plurality of encryption operators and/or a plurality of decryption operators to obtain higher performance.

As illustrated in FIG. 2, the S-Box 1355 may be implemented in an independent apparatus. However, in some cases, the S-Box 1355 may be included in the encryption operator 1352, the decryption operator 1353, and/or the key manager 1354. The encryption operator 1352, the decryption operator 1353, and/or the key manager 1354 may share the S-Box 1355 or may use separate S-Boxes.

An encryption/decryption controller 1356 may control operations of components of the encryption/decryption circuit 1350. For example, the encryption/decryption controller 1356 may control operations of the buffer 1351, the encryption operator 1352, the decryption operator 1353, and the key manager 1354.

For example, the encryption/decryption controller 1356 may initiate the encryption operation of the encryption operator 1352 and/or the decryption operation of the decryption operator 1353 in response to a request REQ. The request REQ may be provided from an external component (e.g., the memory controller 1330 or the processor device 1100) or may be generated inside the encryption/decryption circuit 1350.

The encryption/decryption controller 1356 may include a register 1356a. The register 1356a may store a control value. The control value may be associated with performing either one or both of encryption and decryption operations. For example, the control value may indicate whether the encryption operation is performed or is not performed, or may indicate an environment (e.g., a speed, a security level, a mode of operation, and/or the like) of the encryption operation.

The control value may be stored in the register 1356a in response to the request REQ or based on the determination of the encryption/decryption controller 1356. For example, when the memory controller 1330 provides the encryption/decryption controller 1356 with the request REQ for initiating the encryption operation, the register 1356a may store the control value indicating that the encryption operation is performed. For example, on the basis of the control value stored in the register 1356a, the encryption/decryption controller 1356 may control operations of the buffer 1351, the encryption operator 1352, and the key manager 1354 such that the encryption operation is performed.

The "register" is described with reference to FIG. 2, but the example embodiments are not limited to FIG. 2. To store the control value, the encryption/decryption controller 1356 may employ any other type of memory other than the register. In addition, as described above, blocks illustrated in FIG. 2 are provided to facilitate better understanding without limiting the example embodiments. In other example embodiments, some blocks may be combined to form a block of a larger unit, and/or one block may be divided into a plurality of blocks.

Figure 3:
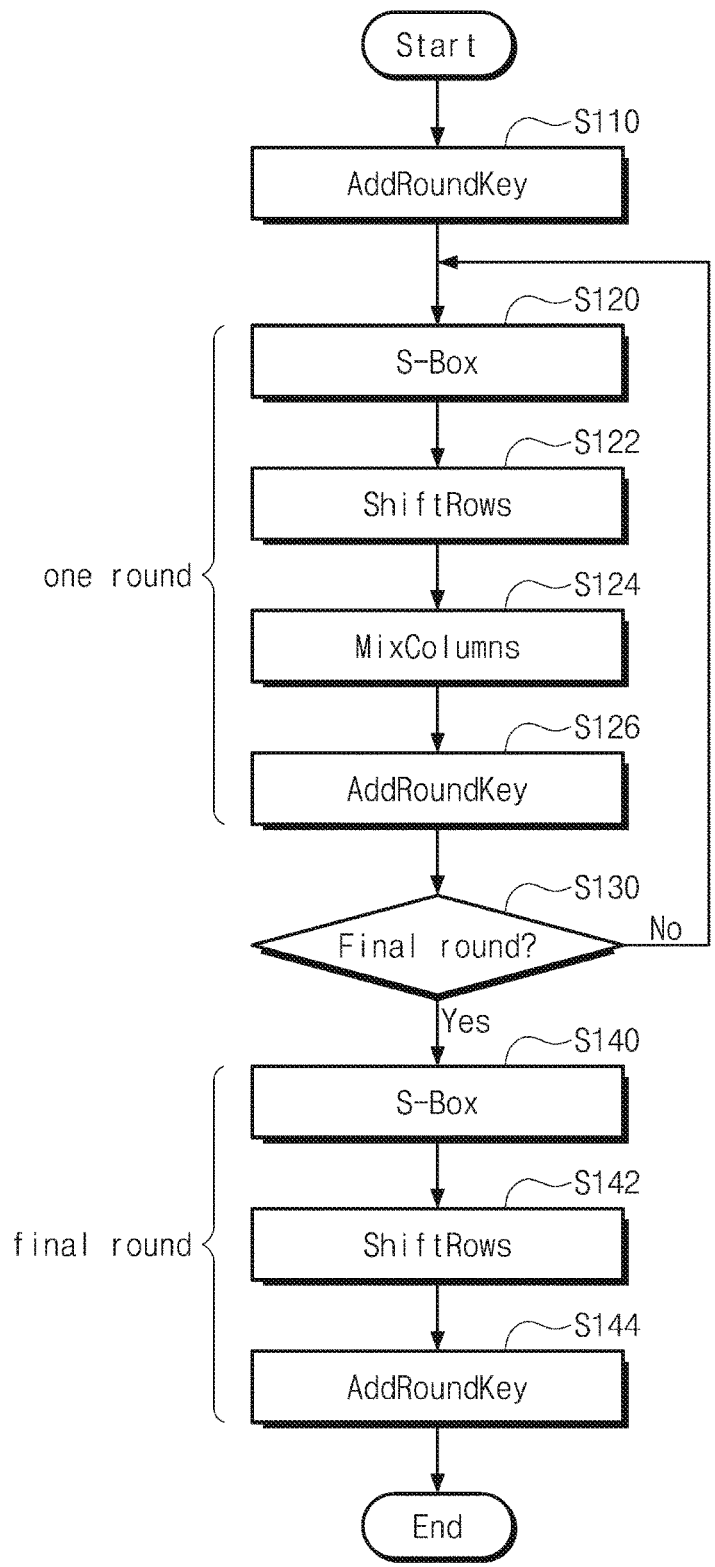
FIG. 3 is a flowchart describing an example encryption operation performed in the encryption/decryption circuit of FIG. 2.

FIG. 3 is a flowchart describing an example encryption operation performed in the encryption/decryption circuit of FIG. 2.

For example, FIG. 3 describes that the encryption/decryption circuit 1350 performs the encryption operation based on AES (Advanced Encryption Standard) established by U.S. NIST (U.S. National Institute of Standards and Technology). The encryption operation may be performed by the encryption operator 1352 under control of the encryption/decryption controller 1356. The register 1356a may store a control value indicating the performance and environment of the encryption operation.

In operation S110, the encryption operator 1352 may perform an "AddRoundKey" operation. The "AddRoundKey" operation may include performing a bitwise combinational logic operation (e.g., a logic OR operation, a logic AND operation, an exclusive OR operation, and/or the like) on data from the buffer 1351 and a key from the key manager 1354. Accordingly, the data from the buffer 1351 may be converted into other data based on a selected key.

In operation S120, the S-Box 1355 may perform the substitution operation on the data converted in operation S110 in response to a request of the encryption operator 1352. In operation S122, the encryption operator 1352 may perform a "ShiftRows" operation on a state of data substituted in operation S120. In the "ShiftRows" operation, rows of the data state may be cyclically shifted. In operation S124, the encryption operator 1352 may perform a "MixColumns" operation on a state of data shifted in operation S122. In the "MixColumns" operation, columns of the data state may be mixed.

Afterwards, in operation S126, the encryption operator 1352 may perform an "AddRoundKey" operation on converted data having a state mixed in operation S124. The encryption operator 1352 may perform the bitwise combinational logic operation on the converted data and the key from the key manager 1354. In example embodiments, the encryption operator 1352 may skip operation S126 and may perform operation S130, according to the condition setting.

Through operations S120 to S126, data from the buffer 1351 may be converted to have a value different from an original value. Accordingly, it is difficult for an attacker to attack data intentionally, and the security level may be improved. Operations S120 to S126 may constitute one round. The key manager 1354 may select different keys for respective rounds to perform the "AddRoundKey" operation of operation S126.

In operation S130, the encryption/decryption controller 1356 may determine whether a next round is the final round. The encryption/decryption controller 1356 may manage a round value, and may increase the round value by 1 whenever one round is performed. For example, a round may be repeated 10 times, 12 times, or 14 times based on the size of data (however, the example embodiments are not limited thereto), and the encryption/decryption controller 1356 may determine whether a next round is the final round based on the round value. For example, the round value may be stored in the register 1356a as a portion of the control value.

If the next round is not the final round, operation S120 may be performed again. In operation S120, the S-Box 1355 may perform the substitution operation on the data converted in operation S126 in response to a request of the encryption operator 1352. If the next round is the final round, operation S140 may be performed.

In operation S140, the S-Box 1355 may perform the substitution operation on the data converted in operation S126 in response to a request of the encryption operator 1352. In operation S142, the encryption operator 1352 may perform the "ShiftRows" operation on a state of data substituted in operation S140. In operation S144, the encryption operator 1352 may perform the "AddRoundKey" operation on converted data having a state shifted in operation S142. For example, after the final round is completed, the round value may be reset (e.g., reset to "0").

A value of data may be gradually converted as a round is repeated. After the final round composed of operations S140 to S144 is completed, finally converted data may be stored in the nonvolatile memories 1310. Accordingly, it may be very difficult for the attacker to manipulate or damage encrypted data of the nonvolatile memories 1310 arbitrarily.

For example, the encryption operation of FIG. 3 may be initiated in response to the request REQ from an external device or based on the determination of the encryption/decryption controller 1356. In example embodiments, the memory controller 1330 may provide the request REQ to the encryption/decryption controller 1356 to store encrypted data in the nonvolatile memories 1310. In response to the request REQ, the encryption/decryption controller 1356 may control the encryption operator 1352 such that the encryption operation is performed. The register 1356a may store a control value indicating that the encryption operation is performed, in response to the request REQ.

The encryption operation may be performed on data having an operation unit size. For example, the operation unit size for a "MixColumns" operation may be 32 bits, and the "MixColumns" operation may be performed on 32-bit data. For example, the operation unit size for a "ShiftRows" operation may be 128 bits, and the "ShiftRows" operation may be performed on 128-bit data.

In example embodiments, the encryption/decryption controller 1356 may monitor the size of data stored in the buffer 1351. When data stored in the buffer 1351 has the operation unit size of the encryption operation, the encryption/decryption controller 1356 may determine that the encryption operation is performed. For example, when the buffer 1351 completely stores 32-bit data for the "MixColumns" operation as data is gradually accumulated in the buffer 1351, the encryption/decryption controller 1356 may control the encryption operator 1352 such that the "MixColumns" operation is performed.

When data stored in the buffer 1351 does not have the operation unit size of the encryption operation, the encryption/decryption controller 1356 may determine that the encryption operation is not performed. On the basis of the determination of the encryption/decryption controller 1356, the register 1356a may store the control value indicating that the encryption operation is performed or is not performed.

In example embodiments, the encryption/decryption controller 1356 may control the encryption operation based on the round value. When the round value corresponds to zero ("0"), the encryption operation may not be performed, and thus, the register 1356a may store the control value indicating that the encryption operation is not performed. When the round value does not correspond to "0" (e.g., when the encryption/decryption controller 1356 increases the round value), the encryption operation may be performed, and thus, the register 1356a may store the control value indicating that the encryption operation is performed.

The decryption operation of the decryption operator 1353 may be performed to correspond to the encryption operation of FIG. 3. For example, the decryption operator 1353 may inversely perform the encryption operations of FIG. 3 to decrypt encrypted data. The register 1356a may store the control value indicating the decryption operation is performed or is not performed. Because the decryption operation may be readily understood by the ordinary skilled in the art, detailed descriptions associated with the decryption operation will be omitted below. The decrypted data may be provided to the memory controller 1330.

The encryption operations defined in the FIPS 197 document issued by the NIST have been described with reference to FIG. 3. However, FIG. 3 is provided to facilitate better understanding without limiting the example embodiments. The encryption/decryption circuit 1350 may employ other kinds of standards associated with the encryption/decryption operation. Alternatively, the encryption/decryption circuit 1350 may employ operations different from those illustrated in FIG. 3 to improve the security level.

Figure 4:
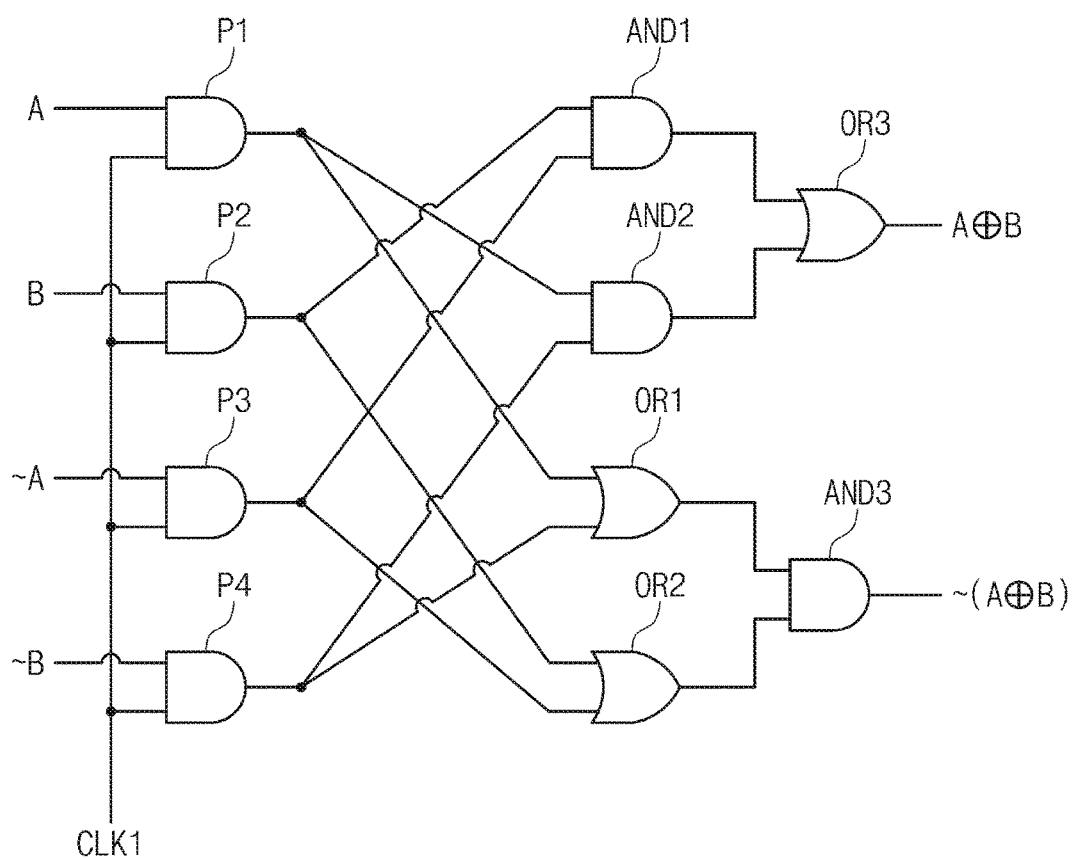
FIG. 4 is a block diagram illustrating an example logic circuit included in the encryption/decryption circuit of FIG. 2.
Figures 5, 6:
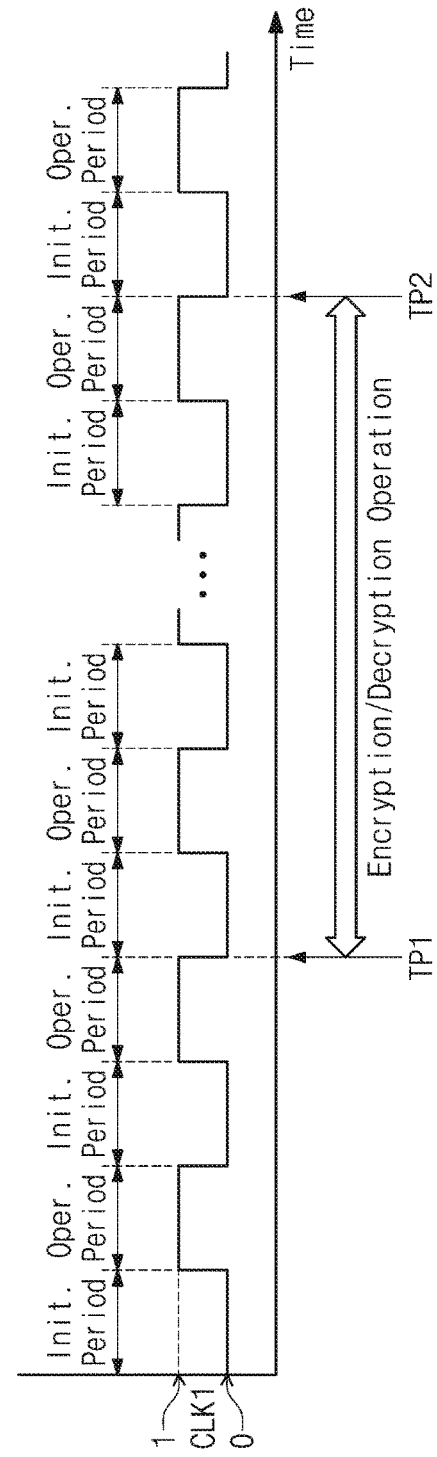
FIG. 5 is a table for describing an operation of the logic circuit of FIG. 4.
FIG. 6 is a timing diagram for describing time periods of an example encryption/decryption operation performed in the encryption/decryption circuit of FIG. 2.

FIG. 4 is a block diagram illustrating an example logic circuit included in the encryption/decryption circuit of FIG. 2. FIG. 5 is a table for describing an operation of the logic circuit of FIG. 4.

Some encryption/decryption circuits may be attacked by the side-channel analysis attack. In the side-channel analysis attack, the attacker may collect subsidiary information such as, but not limited to, the amount of power consumed by the encryption/decryption circuit, waveforms of electromagnetic waves generated by the encryption/decryption circuit, and/or the like. The attacker may attack the encryption/decryption circuit to find a key used in the encryption/decryption circuit based on the collected information.

Accordingly, the encryption/decryption circuit 1350 according to the example embodiments may include a logic circuit LGC for preventing the side-channel analysis attack. Referring to FIG. 4, the logic circuit LGC may perform a combinational logic operation corresponding to an exclusive OR operation. In some examples, the encryption operator 1352 may include the logic circuit LGC, and the logic circuit LGC may be associated with the "AddRoundKey" operation (e.g., in operation S110, operation S126, and operation S144 of FIG. 3).

The logic circuit LGC may receive four inputs "A", "B", "~A", and "~B". The input "~A" may correspond to an inverted value of the input "A", and the input "~B" may correspond to an inverted value of the input "B". For example, when the logic circuit LGC is associated with the "AddRoundKey" operation, the input "A" may correspond to a bit included in data from the buffer 1351, and the input "B" may correspond to a bit included in a key from the key manager 1354. The logic circuit LGC may output results that correspond to an exclusive OR of the inputs "A" and "B" and an inverted value of the exclusive OR.

The inputs "A", "B", "~A", and "~B" may respectively pass or not pass through logic gates P1, P2, P3, and P4 based on the clock signal CLK1. For example, while the clock signal CLK1 has a first logic value (e.g., logic "0"), the input "A", "B", "~A", and "~B" may not pass through the logic gates P1, P2, P3, and P4, and thus, each of the logic gates P1, P2, P3, and P4 may output the first logic value (e.g., logic "0"). While the clock signal CLK1 has a second logic value (e.g., logic "1"), the input "A", "B", "~A", and "~B" may respectively pass through the logic gates P1, P2, P3, and P4 (i.e., the logic gates P1, P2, P3, and P4 may respectively output values that correspond to the inputs "A", "B", "~A", and "~B"). Herein, "pass" of an input may mean that the input has active influence on generating an output of a logic gate.

Logic gates AND1, AND2, OR1, and OR2 may combine values output from the logic gates P1, P2, P3, and P4. The logic gates OR3 and AND3 may combine values output from the logic gates AND1, AND2, OR1, and OR2. Accordingly, the logic gates OR3 and AND3 may output results that respectively correspond to an exclusive OR of the inputs "A" and "B" and an inverted value of the exclusive OR.

FIG. 5 illustrates a relationship between inputs "A" and "B" and logic gates AND1, AND2, AND3, OR1, OR2, and OR3 of the logic circuit LGC. When the clock signal CLK1 has a value of logic "0", each of the logic gates AND1, AND2, AND3, OR1, OR2, and OR3 may output a value of logic "0" regardless of values of the inputs "A" and "B". When the clock signal CLK1 has a value of logic "1", the logic gates AND1, AND2, AND3, OR1, OR2, and OR3 may output different values based on values of the inputs "A" and "B".

Referring to FIG. 5, it is understood that the number of logic gates each of which outputs a value of logic "1" is constant while the clock signal CLK1 has a value of logic "1". For example, in the logic circuit LGC of FIG. 4, logic gates of which outputs a value of logic "1" may be changed according to values of the inputs "A" and "B". However, regardless of values of the inputs "A" and "B", one AND gate may output a value of logic "1", and two OR gates may output values of logic "1".

In the logic circuit LGC of FIG. 4, the number of logic gates each of which outputs a value of logic "1" may be maintained constant, and thus, the total amount of power consumed by the logic circuit LGC may be maintained constant. For this reason, even though an attacker collects subsidiary information (e.g., the amount of power consumed by the logic circuit LGC and waveforms of electromagnetic waves generated by the logic circuit LGC), it may be difficult for the attacker to understand a configuration and an operation of the logic circuit LGC. As a result, the logic circuit LGC may make it possible to protect data from the side-channel analysis attack.

However, the configuration and operation of the logic circuit LGC described with reference to FIGS. 4 and 5 are only examples to facilitate better understanding without limiting the example embodiments. The configuration and operation of the logic circuit LGC may be variously modified or changed. In addition, the logic circuit LGC is only one example of various logic circuits included in the encryption/decryption circuit 1350. The encryption/decryption circuit 1350 may further include many other logic circuits with various configurations to perform the encryption and decryption operations.

In the example embodiments of the present disclosure, the encryption/decryption circuit 1350 may include one or more logic circuits configured to consume the constant amount of power to prevent the side-channel analysis attack. These logic circuits may include a plurality of logic gates. Among the logic gates, the number of logic gates each of which outputs a value of logic "0" and the number of logic gates each of which outputs a value of logic "1" may be maintained constant.

FIG. 6 is a timing diagram for describing time periods of an example encryption/decryption operation performed in the encryption/decryption circuit of FIG. 2.

The clock signal CLK1 of FIGS. 2 and 4 will be described to facilitate better understanding. The clock signal CLK1 may have a value of logic "0" and a value of logic "1" in turn (e.g., alternately). The encryption/decryption circuit 1350 may perform the encryption operation and/or the decryption operation while the clock signal CLK1 has a value of logic "1". For example, the logic circuit LGC of FIG. 4 may output an exclusive OR value of the inputs "A" and "B" while the clock signal CLK1 has a value of logic "1".

The encryption/decryption circuit 1350 may not perform the encryption operation and/or the decryption operation while the clock signal CLK1 has a value of logic "0". For example, while the clock signal CLK1 has a value of logic "0", the logic circuit LGC of FIG. 4 may output a value of logic "0" regardless of values of the inputs "A" and "B", and thus the encryption operation may not be performed. When the clock signal CLK1 has a value of logic "0", a state of logic gates of the encryption/decryption circuit 1350 may be reset, and thus power consumption of the logic gates may be minimized.

Changing (e.g., switching) the state and power consumption of the logic gates based on the clock signal CLK1 may make the side-channel analysis attack more difficult. Accordingly, the alternation of logic values of the clock signal CLK1 may improve the security level.

A state of logic gates may be reset while the clock signal CLK1 has a value of logic "0". A first time period in which the clock signal CLK1 has a value of logic "0" may be referred to as an "initialization period". Either one or both of the encryption operation and the decryption operation may be performed while the clock signal CLK1 has a value of logic "1". A second time period in which the clock signal CLK1 has a value of logic "1" may be referred to as an "operation period". The initialization period and the operation period may occur in turn (e.g., alternately) in response to the alternation of logic values of the clock signal CLK1.

In some examples, operations of one round may be performed during one operation period. In some other examples, operations of a plurality of rounds may be performed during one operation period. In some other examples, operations of one round may be performed during a plurality of operation periods. The relationship between the operation period and the round may be changed or modified based on various factors such as, but not limited to, the hardware size, operation performance, operation policy, and/or the like, of the encryption/decryption circuit 1350.

However, the encryption operation and the decryption operation may not be performed during the whole operation period. For example, when the request REQ is not provided from an external device, the encryption operation and the decryption operation may not be performed even in the operation period. For example, when the encryption/decryption controller 1356 determines that the encryption operation and the decryption operation are not performed (e.g., when the size of data stored in the buffer 1351 is smaller than the operation unit size), the encryption operation and the decryption operation may not be performed even in the operation period.

For example, the encryption operation and/or the decryption operation may be performed between a time point TP1 and a time point TP2 based on the request REQ from the external device or the determination of the encryption/decryption controller 1356. In this case, the encryption operation and the decryption operation may not be performed in a time period before the time point TP1 and a time period after the time point TP2.

In some cases, even though the encryption operation and the decryption operation are not performed, logic values of the clock signal CLK1 may continue to alternate. However, alternating logic values of the clock signal CLK1 while the encryption operation and the decryption operation are not performed may increase the amount of power consumed by the encryption/decryption circuit 1350. This is because each logic gate repeats outputting logic "0" (in the initialization period) and outputting logic "1" (in the operation period) (i.e., power may be consumed as an output value is repeatedly switched).

In addition, as described above, the encryption operation and/or the decryption operation may be performed only in the operation period. Accordingly, when a length of the initialization period becomes longer, a length of the operation period may become shorter, and thus the operation performance of the encryption/decryption circuit 1350 may be degraded.

Figure 7:
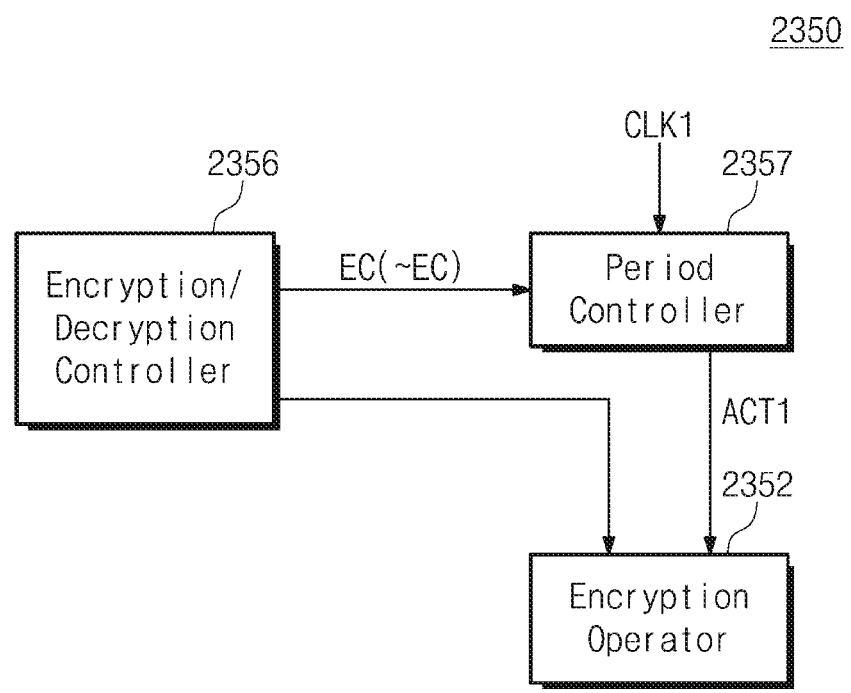
FIG. 7 is a block diagram illustrating an example configuration included in the encryption/decryption circuit of FIG. 2.

FIG. 7 is a block diagram illustrating an example configuration included in the encryption/decryption circuit of FIG. 2. In example embodiments, an encryption/decryption circuit 2350 may include an encryption operator 2352, an encryption/decryption controller 2356, and a period controller 2357.

Configurations and operations of the encryption operator 2352 and the encryption/decryption controller 2356 may include configurations and operations of the encryption operator 1352 and the encryption/decryption controller 1356 of FIG. 2, respectively. FIG. 7 illustrates only an example configuration of the encryption/decryption circuit 2350, and the encryption/decryption circuit 2350 may further include components included in the encryption/decryption circuit 1350 of FIG. 2. For brevity, redundant descriptions associated with the encryption/decryption circuit 2350, the encryption operator 2352, and the encryption/decryption controller 2356 will be omitted below.

The encryption/decryption controller 2356 may output a control value EC and/or an inverted value "~EC" of the control value EC. The control value EC may be associated with performing the encryption operation. For example, the control value EC may indicate whether the encryption operation is performed or is not performed. For example, the control value EC may be output from the register 1356a of FIG. 2.

The period controller 2357 may receive the clock signal CLK1. The period controller 2357 may receive the control value EC from the encryption/decryption controller 2356. In some cases, the period controller 2357 may receive the inverted value "~EC" of the control value EC together with the control value EC or instead of the control value EC.

The period controller 2357 may generate an activation signal ACT1 based on the control value EC (and/or the inverted value "~EC" of the control value EC) and the clock signal CLK1. The encryption operator 2352 may not directly receive the clock signal CLK1, but it may operate based on the activation signal ACT1. For example, the encryption operator 2352 may perform the encryption operation based on the activation signal ACT1.

Unlike the clock signal CLK1, logic values of the activation signal ACT1 may not alternate while the encryption operation is not performed. Accordingly, while the encryption operation is not performed, outputs of logic gates included in the encryption operator 2352 may not be changed. In addition, while the encryption operation is not performed, the amount of power consumed by the logic gates included in the encryption operator 2352 may be maintained constant. The activation signal ACT1 will be described in detail with reference to FIGS. 8 and 10.

In example embodiments, all or a part of the period controller 2357 may be included in the encryption/decryption controller 2356. In some other example embodiments, all or a part of the period controller 2357 may be provided outside the encryption/decryption circuit 2350. The example configuration of FIG. 7 is provided to facilitate better understanding without limiting example embodiments. The configuration of the encryption/decryption circuit 2350 may be variously changed or modified.

Figure 8:
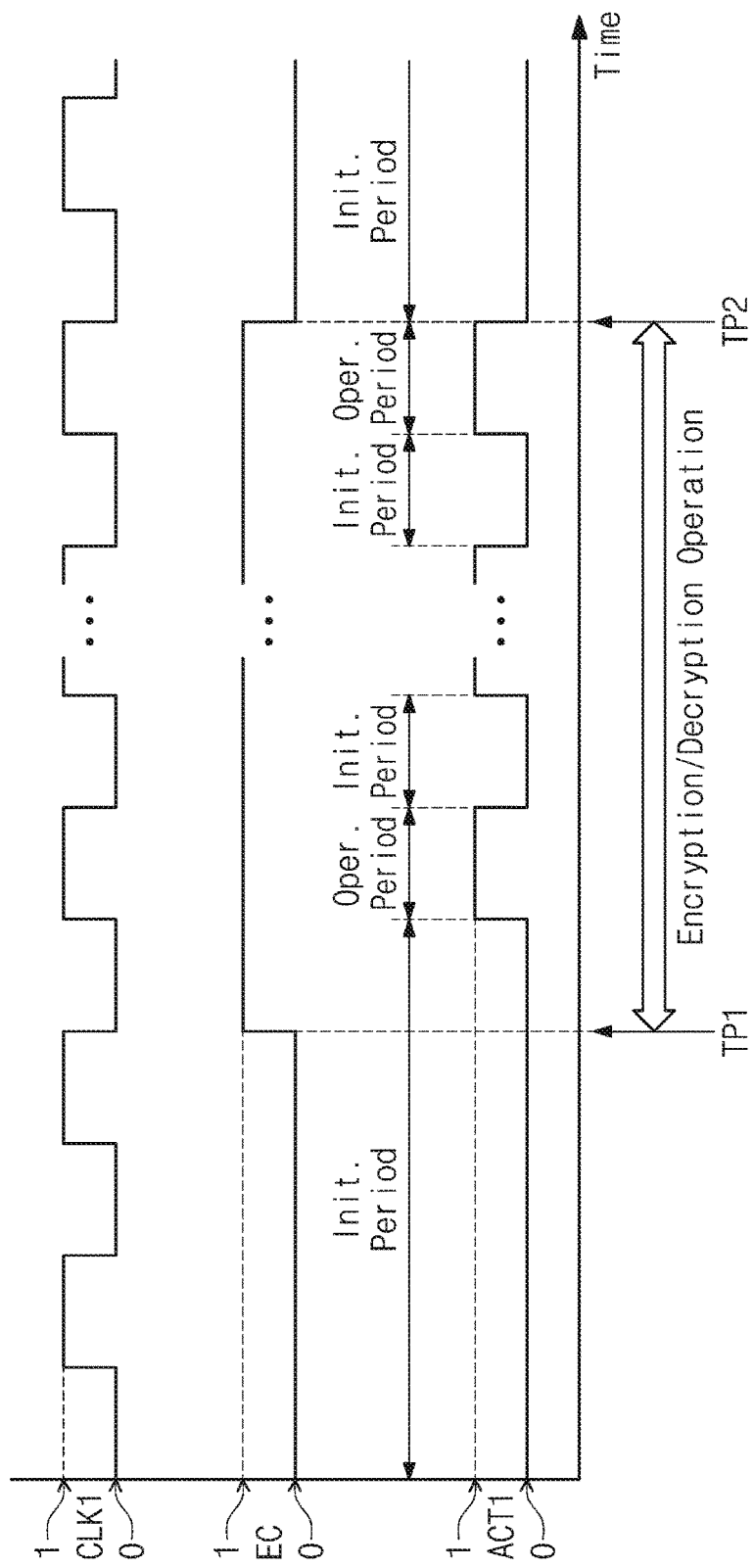
FIG. 8 is a timing diagram for describing time periods of an example encryption/decryption operation performed in the encryption/decryption circuit that includes a period controller of FIG. 7.

FIG. 8 is a timing diagram for describing time periods of an example encryption/decryption operation performed in the encryption/decryption circuit that includes a period controller of FIG. 7.

The period controller 2357 may receive the clock signal CLK1 that has a value of logic "0" and a value of logic "1" in turn. In addition, the period controller 2357 may receive the control value EC indicating whether the encryption operation and/or the decryption operation is performed or is not performed.

For example, the control value EC of logic "0" may indicate that the encryption operation and/or the decryption operation are not performed. For example, when the request REQ is not provided from an external device, the control value EC may have a value of logic "0". For example, when data stored in the buffer 1351 of FIG. 2 does not have the operation unit size, the control value EC may have a value of logic "0". For example, when a round value corresponds to "0", the control value EC may have a value of logic "0".

For example, the encryption operation and the decryption operation may not be performed in a time period before the time point TP1 and a time period after the time point TP2. Accordingly, in the time period before the time point TP1 and the time period after the time point TP2, the control value EC may have a value of logic "0" to indicate that the encryption operation and/or the decryption operation is not performed.

For example, the control value EC of logic "1" may indicate that the encryption operation and/or the decryption operation are performed. For example, when the request REQ is provided from an external device, the control value EC may have a value of logic "1". For example, when data stored in the buffer 1351 have the operation unit size, the control value EC may have a value of logic "1". For example, when a round value does not correspond to "0" (e.g., when the round value increases to a value of "1" or more), the control value EC may have a value of logic "1".

For example, either one or both of the encryption operation and the decryption operation may be performed in a time period between the time points TP1 and TP2. Accordingly, in the time period between the time points TP1 and TP2, the control value EC may have a value of logic "1" to indicate that the encryption operation and/or the decryption operation is performed.

However, the above examples are provided to facilitate better understanding without limiting the example embodiments. In some other example embodiments, the control value EC of logic "0" may indicate that the encryption operation and/or the decryption operation is performed, and the control value EC of logic "1" may indicate that the encryption operation and/or the decryption operation is not performed.

The activation signal ACT1 may have a deactivation value and an activation value based on the clock signal CLK1 and the control value EC. For better understanding, it will be assumed that the deactivation value of the activation signal ACT1 corresponds to logic "0" and the activation value of the activation signal ACT1 corresponds to logic "1". However, the example embodiments are not limited thereto. For example, a logic value corresponding to the deactivation value and a logic value corresponding to the activation value may be interchangeable.

While the control value EC has a value of logic "0", the activation signal ACT1 may be maintained at the deactivation value (e.g., logic "0") without alternation. As described above, the encryption operator 2352 may operate based on the activation signal ACT1 instead of the clock signal CLK1. Accordingly, when the control value EC indicates that the encryption operation and/or the decryption operation is not performed, outputs from logic gates of the encryption operator 2352 may not be changed. For example, the logic circuit LGC of FIG. 4 may receive the deactivation value of the activation signal ACT1 instead of the clock signal CLK1, and each of logic gates of the logic circuit LGC may output a first logic value (e.g., logic "0") in response to the deactivation value of the activation signal ACT1.

While the encryption operation and/or the decryption operation is not performed, the logic gates of the encryption operator 2352 may operate in a first time period (e.g., the initialization period) based on the deactivation value of the activation signal ACT1. During the initialization period, because outputs of the logic gates of the encryption operator 2352 are not changed, the amount of power consumed by the logic gates may be maintained constant. In addition, because the outputs of the logic gates are not changed, it may be possible to prevent power consumption due to switch of an output value.

While the control value EC has a value of logic "1", the activation signal ACT1 may alternately have the deactivation value and the activation value in response to the clock signal CLK1. Accordingly, when the control value EC indicates that the encryption operation and/or the decryption operation is performed, the logic gates of the encryption operator 2352 may alternately operate in a first time period (e.g., the initialization period) and in a second time period (e.g., the operation period) in response to the alternation of the activation signal ACT1 (i.e., the alternation of the deactivation value and the activation value thereof).

In the operation period, the encryption operator 2352 may perform the encryption operation (and/or the decryption operation) by using the logic gates. The encryption operation and/or the decryption operation may be performed in response to the activation value of the activation signal ACT1. During the operation period, as described with reference to FIGS. 4 and 5, the number of logic gates each of which outputs a first logic value and the number of logic gates each of which outputs a second logic value may be maintained constant.

Figure 9A:
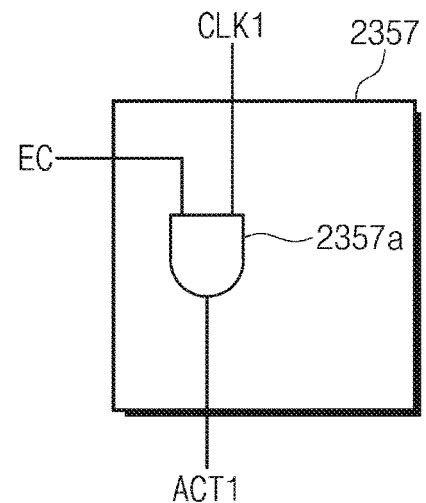
FIGS. 9A and 9B are block diagrams illustrating example configurations of a period controller of FIG. 7 with regard to the timing diagram of FIG. 8.
Figure 9B:
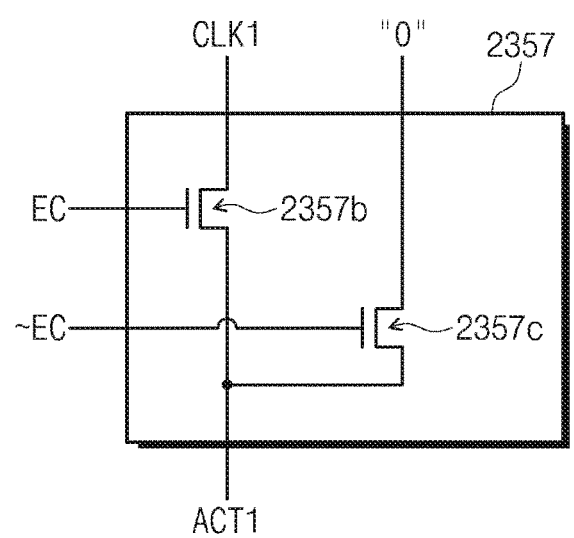

FIGS. 9A and 9B are block diagrams illustrating example configurations of a period controller of FIG. 7 with regard to the timing diagram of FIG. 8.

Referring to FIG. 9A, the period controller 2357 may include a combinational logic gate 2357a. The combinational logic gate 2357a may combine the clock signal CLK1 and the control value EC to generate the activation signal ACT1. For example, the combinational logic gate 2357a may perform a logical AND operation on the clock signal CLK1 and the control value EC.

In an example of FIG. 9A, when the control value EC indicates that the encryption operation and/or the decryption operation is not performed (e.g., the control value EC has a value of logic "0"), the combinational logic gate 2357a may generate the activation signal ACT1 having the deactivation value (e.g., logic "0"). On the other hand, when the control value EC indicates that the encryption operation and/or the decryption operation is performed (e.g., the control value EC has a value of logic "1"), the combinational logic gate 2357a may generate the activation signal ACT1 corresponding to the clock signal CLK1 (i.e., having the deactivation value and the activation value in turn).

Referring to FIG. 9B, the period controller 2357 may include transistors 2357b and 2357c. The transistor 2357b may transfer the clock signal CLK1 as the activation signal ACT1 in response to the control value EC. The transistor 2357c may transfer a value of logic "0" as the activation signal ACT1 in response to the inverted value "~EC" of the control value EC.

In an example of FIG. 9B, when the control value EC indicates that the encryption operation and/or the decryption operation is not performed (e.g., the control value EC has a value of logic "0"), the transistor 2357c may transfer the activation signal ACT1 having the deactivation value (e.g., logic "0"). On the other hand, when the control value EC indicates that the encryption operation and/or the decryption operation is performed (e.g., the control value EC has a value of logic "1"), the transistor 2357b may transfer the activation signal ACT1 corresponding to the clock signal CLK1 (i.e., having the deactivation value and the activation value in turn).

When the period controller 2357 employs the configuration of FIG. 9A or 9B, the period controller 2357 may generate the activation signal ACT1 described with reference to FIG. 8. In this case, while the encryption operation and/or the decryption operation is not performed, outputs from logic gates may be maintained constant in the initialization period. Accordingly, it may be possible to prevent power consumption due to switch of an output value.

Figure 10:
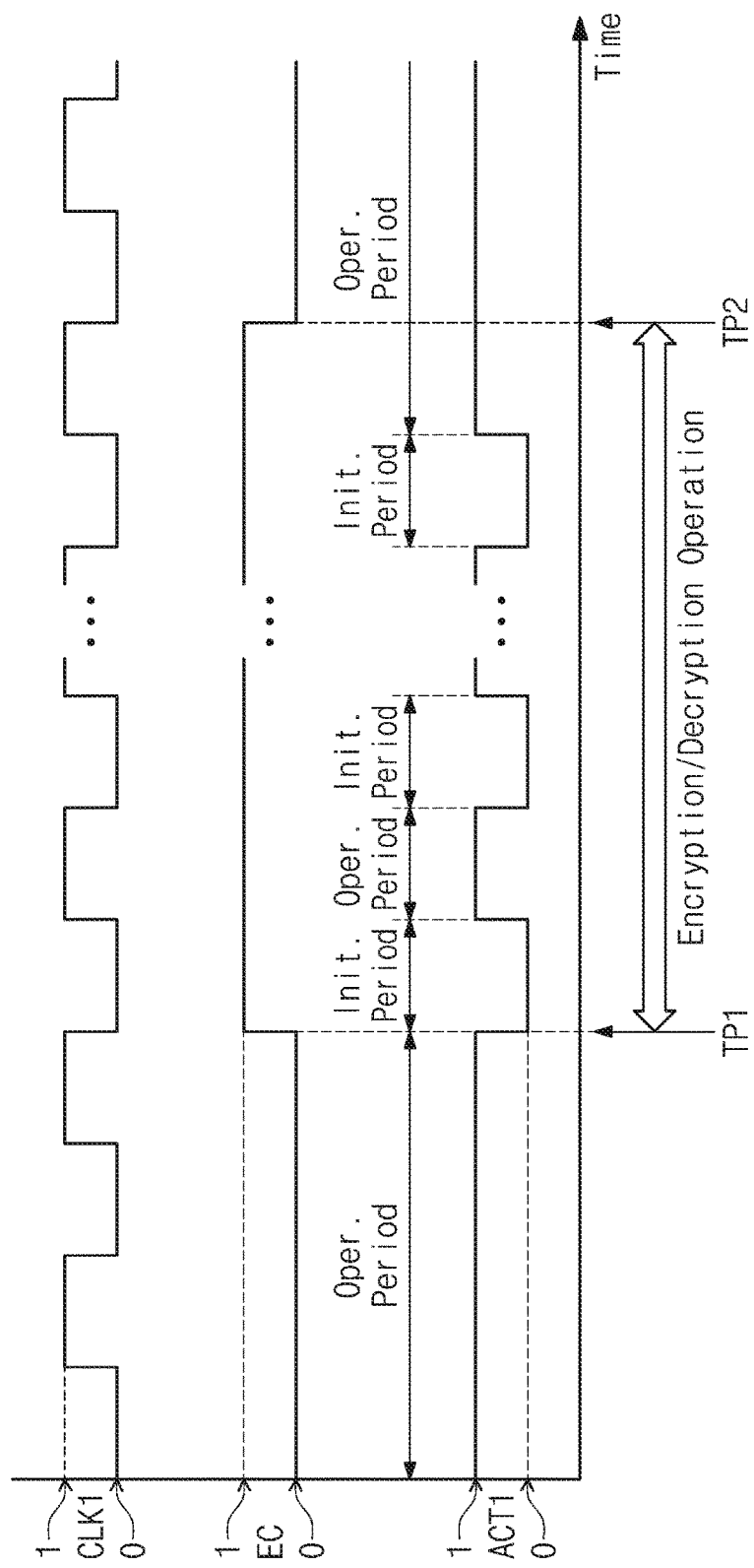
FIG. 10 is a timing diagram for describing time periods of an example encryption/decryption operation performed in the encryption/decryption circuit that includes the period controller of FIG. 7.

FIG. 10 is a timing diagram for describing time periods of an example encryption/decryption operation performed in the encryption/decryption circuit that includes the period controller of FIG. 7.

Unlike the timing diagram of FIG. 8, referring to FIG. 10, while the control value EC has a value of logic "0", the activation signal ACT1 may be maintained at the activation value (e.g., logic "1"). Accordingly, when the control value EC indicates that the encryption operation and/or the decryption operation are not performed, the logic gates of the encryption operator 2352 may operate in a second time period (e.g., the operation period). For example, while the encryption operation and/or the decryption operation is not performed, the logic gates of the encryption operator 2352 may operate in the operation period in response to the activation value of the activation signal ACT1.

When the encryption operation and/or the decryption operation are not performed, data input to the encryption operator 2352 may not be changed. For example, while the encryption operation and/or the decryption operation is not performed, the encryption operator 2352 may continuously receive data of a default value or data used in the previous operation. Accordingly, even though the encryption operator 2352 operates in the operation period, outputs from the logic gates of the encryption operator 2352 may not be changed. As a result, even though the operation period is maintained, the amount of power consumed by the logic gates may be maintained constant and power consumption due to switch of an output value may be prevented.

In some cases, when the encryption operation and/or the decryption operation are not performed, data input to the encryption operator 2352 may be changed. For example, the encryption operator 2352 may receive data to be used for a next operation or a register setting value. In this case, outputs from the logic gates of the encryption operator 2352 may be changed once. However, while the encryption operation and/or the decryption operation are not performed, data input to the encryption operator 2352 may not be changed many times. Accordingly, even though the operation period is maintained, it may be possible to minimize power consumption due to switch of an output value.

While the control value EC has a value of logic "1", the activation signal ACT1 may alternately have the deactivation value and the activation value in response to the clock signal CLK1. This may correspond to a time period between the time points TP1 and TP2 described with reference to FIG. 8. For brevity, redundant descriptions will be omitted below.

Figure 11A:
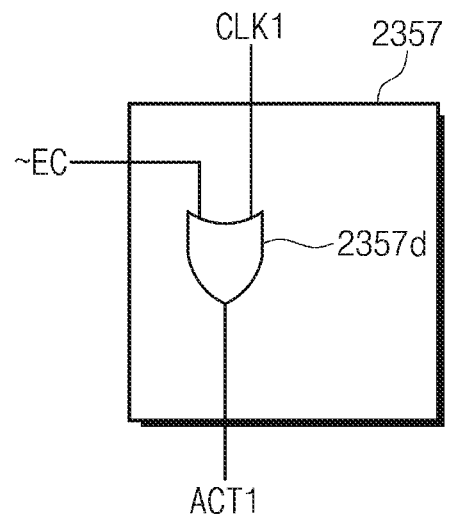
FIGS. 11A and 11B are block diagrams illustrating example configurations of the period controller of FIG. 7 with regard to the timing diagram of FIG. 10.
Figure 11B:
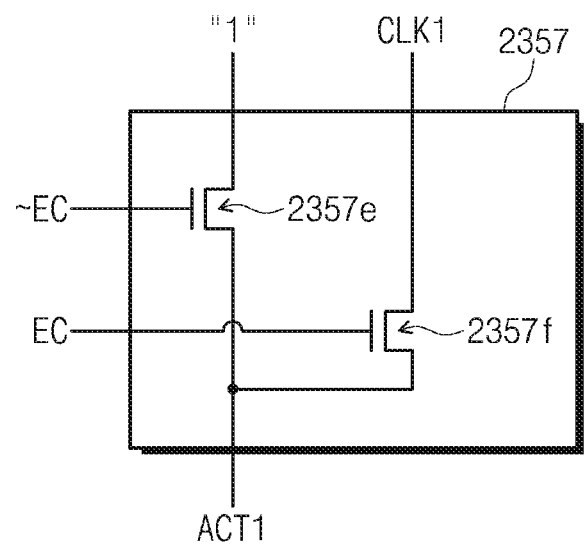

FIGS. 11A and 11B are block diagrams illustrating example configurations of the period controller of FIG. 7 with regard to the timing diagram of FIG. 10.

Referring to FIG. 11A, the period controller 2357 may include a combinational logic gate 2357d. The combinational logic gate 2357d may combine the clock signal CLK1 and the inverted value "~EC" of the control value EC to generate the activation signal ACT1. For example, the combinational logic gate 2357d may perform a logical OR operation on the clock signal CLK1 and the inverted value "~EC" of the control value EC.

In an example of FIG. 11A, when the control value EC indicates that the encryption operation and/or the decryption operation is not performed (e.g., the control value EC has a value of logic "0"), the combinational logic gate 2357d may generate the activation signal ACT1 having the activation value (e.g., logic "1"). On the other hand, when the control value EC indicates that the encryption operation and/or the decryption operation is performed (e.g., the control value EC has a value of logic "1"), the combinational logic gate 2357d may generate the activation signal ACT1 corresponding to the clock signal CLK1 (i.e., having the deactivation value and the activation value in turn).

Referring to FIG. 11B, the period controller 2357 may include transistors 2357e and 2357f. The transistor 2357e may transfer a value of logic "1" as the activation signal ACT1 in response to the inverted value "~EC" of the control value EC. The transistor 2357f may transfer the clock signal CLK1 as the activation signal ACT1 in response to the control value EC.

In an example of FIG. 11B, when the control value EC indicates that the encryption operation and/or the decryption operation is not performed (e.g., the control value EC has a value of logic "0"), the transistor 2357e may transfer the activation signal ACT1 having the activation value (e.g., logic "1"). On the other hand, when the control value EC indicates that the encryption operation and/or the decryption operation is performed (e.g., the control value EC has a value of logic "1"), the transistor 2357f may transfer the activation signal ACT1 corresponding to the clock signal CLK1 (i.e., having the deactivation value and the activation value in turn).

When the period controller 2357 employs the configuration of FIG. 11A or 11B, the period controller 2357 may generate the activation signal ACT1 described with reference to FIG. 10. In this case, while the encryption operation and/or the decryption operation is not performed, outputs from logic gates may be maintained constant or may be changed once in the operation period. Accordingly, it may be possible to prevent or minimize power consumption due to switch of an output value.

Figure 12:
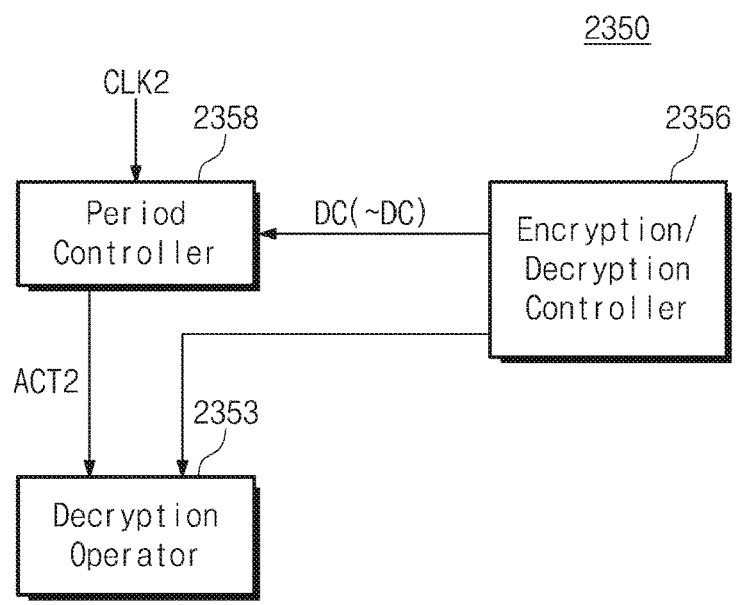
FIG. 12 is a block diagram illustrating an example configuration included in the encryption/decryption circuit of FIG. 2.

FIG. 12 is a block diagram illustrating an example configuration included in the encryption/decryption circuit of FIG. 2.

Referring to FIG. 12, in example embodiments, the encryption/decryption circuit 2350 may further include a period controller 2358. The encryption/decryption controller 2356 may output a control value DC and/or an inverted value "~DC" of the control value DC. The control value DC may be associated with performing the decryption operation. For example, the control value DC may indicate whether the decryption operation is performed or is not performed. For example, the control value DC may be output from the register 1356a of FIG. 2.

The period controller 2358 may receive a clock signal CLK2. The period controller 2358 may receive the control value DC from the encryption/decryption controller 2356. In some cases, the period controller 2358 may receive the inverted value "~DC" of the control value DC together with the control value DC or instead of the control value DC.

The period controller 2358 may generate an activation signal ACT2 based on the control value DC (and/or the inverted value "~DC" of the control value DC) and the clock signal CLK2. The decryption operator 2353 may not directly receive the clock signal CLK2, but it may operate based on the activation signal ACT2. For example, the decryption operator 2353 may perform the decryption operation based on the activation signal ACT2.

Unlike the clock signal CLK2, logic values of the activation signal ACT2 may not alternate while the decryption operation is not performed. Similarly to those described with reference to FIGS. 8 and 10, when the decryption operation is not performed, the control value DC may indicate that the decryption operation is not performed. While the decryption operation is not performed, the activation signal ACT2 may maintain one of a deactivation value and an activation value. To this end, the period controller 2358 may include a configuration similar to that illustrated in FIG. 9A, 9B, 11A, or 11B.

While the decryption operation is not performed, logic gates of the decryption operator 2353 may operate in a first time period (e.g., the initialization period) based on the deactivation value of the activation signal ACT2. Alternatively, while the decryption operation is not performed, the logic gates of the decryption operator 2353 may operate in a second time period (e.g., the operation period) based on the activation value of the activation signal ACT2. Accordingly, outputs from the logic gates of the decryption operator 2353 may not be changed, and power consumption due to switch of an output value may be prevented or minimized.

Figure 13:
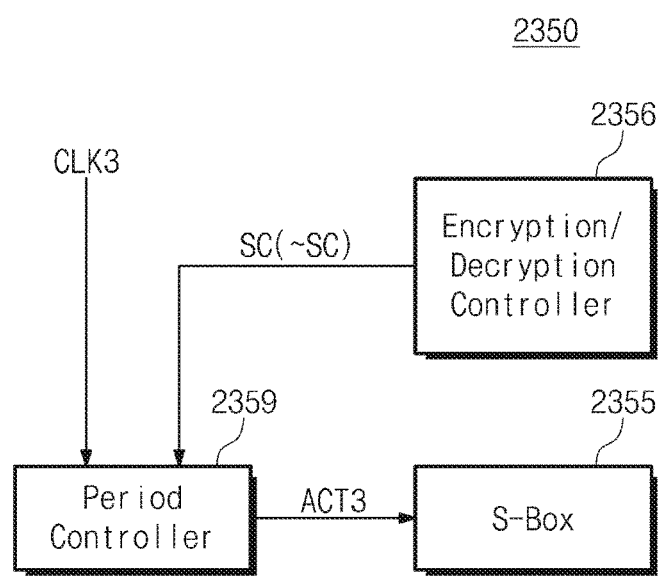
FIG. 13 is a block diagram illustrating an example configuration included in the encryption/decryption circuit of FIG. 2.

FIG. 13 is a block diagram illustrating an example configuration included in the encryption/decryption circuit of FIG. 2.

Referring to FIG. 13, in example embodiments, the encryption/decryption circuit 2350 may further include a period controller 2359. The encryption/decryption controller 2356 may output a control value SC and/or an inverted value "~SC" of the control value SC. The control value SC may be associated with performing the substitution operation. For example, the control value SC may indicate whether the substitution operation is performed or is not performed. For example, the control value SC may be output from the register 1356a of FIG. 2.

The period controller 2359 may receive a clock signal CLK3. The period controller 2359 may receive the control value SC from the encryption/decryption controller 2356. In some cases, the period controller 2359 may receive the inverted value "~SC" of the control value SC together with the control value SC or instead of the control value SC.

The period controller 2359 may generate an activation signal ACT3 based on the control value SC (and/or the inverted value "~SC" of the control value SC) and the clock signal CLK3. The S-Box 2355 may not directly receive the clock signal CLK3, but it may operate based on the activation signal ACT3. For example, the S-Box 2355 may perform the substitution operation based on the activation signal ACT3.

Unlike the clock signal CLK3, logic values of the activation signal ACT3 may not alternate while the substitution operation is not performed. As in those described with reference to FIGS. 8 and 10, when the substitution operation is not performed, the control value SC may indicate that the substitution operation is not performed. While the substitution operation is not performed, the activation signal ACT3 may maintain one of an inactive signal and an activation signal. To this end, the period controller 2359 may include a configuration similar to that illustrated in FIG. 9A, 9B, 11A, or 11B.

While the substitution operation is not performed, logic gates of the S-Box 2355 may operate in a first time period (e.g., the initialization period) based on the deactivation value of the activation signal ACT3. Alternatively, while the substitution operation is not performed, the logic gates of the S-Box 2355 may operate in a second time period (e.g., the operation period) based on the activation value of the activation signal ACT3. Accordingly, outputs from the logic gates included in the S-Box 2355 may not be changed, and power consumption due to switch of an output value may be prevented or minimized.

In example embodiments, all or a part of the period controllers 2358 and 2359 may be included in the encryption/decryption controller 2356. In some other example embodiments, all or a part of the period controller 2358 and 2359 may be provided outside the encryption/decryption circuit 2350. The example configurations of FIGS. 12 and 13 are provided to facilitate better understanding without limiting the example embodiments. The configuration of the encryption/decryption circuit 2350 may be variously changed or modified.

Figure 14:
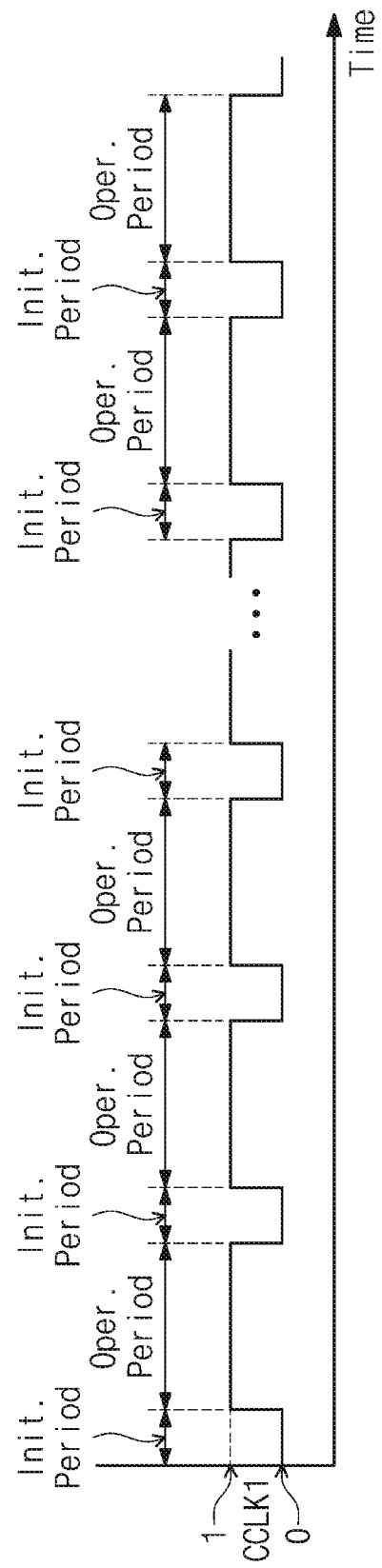
FIG. 14 is a timing diagram for describing time periods of an example encryption/decryption operation performed in the encryption/decryption circuit of FIG. 2.

FIG. 14 is a timing diagram for describing time periods of an example encryption/decryption operation performed in the encryption/decryption circuit of FIG. 2.

As described above, the encryption/decryption circuit 1350 may perform the encryption operation and/or the decryption operation in the operation period. In the initialization period, a state of each logic gate of the encryption/decryption circuit 1350 may be reset. Accordingly, the encryption operation and the decryption operation may not be performed in the initialization period. For this reason, when a length of the initialization period becomes longer, a length of the operation period may become shorter, and thus the operation performance of the encryption/decryption circuit 1350 may be degraded.

In example embodiments, a changed clock signal CCLK1 of FIG. 14 may replace the clock signal CLK1 of FIGS. 6 and 7. Comparing the changed clock signal CCLK1 to the clock signal CLK1, it is understood that a length of a time period in which the changed clock signal CCLK1 has a value of logic "1" is longer than a length of a time period in which the clock signal CLK1 has a value of logic "1". On the other hand, it is understood that a length of a time period in which the changed clock signal CCLK1 has a value of logic "0" is shorter than a length of a time period in which the clock signal CLK1 has a value of logic "0".

That is, a duty ratio or a duty cycle of the changed clock signal CCLK1 may be different from a duty ratio or a duty cycle of the clock signal CLK1. Due to the change or adjustment of the duty ratio, a length of a time period (e.g., the initialization period) when the changed clock signal CCLK1 has a first logic value (e.g., logic "0") is shorter than a length of a time period (e.g., the operation period) when the changed clock signal CLK1 has a second logic value (e.g., logic "1").

Accordingly, when the changed clock signal CCLK1 is employed instead of the clock signal CLK1, a length of the initialization period may become shorter, and a length of the operation period may become longer. In this case, more encryption operations and/or decryption operations may be performed during the longer operation period(s). As a result, the operation performance of the encryption/decryption circuit 1350 may be improved. Each of the clock signals CLK2 and CLK3 of FIGS. 2, 12, and 13 may be replaced with the changed clock signal CCLK1.

The changed clock signal CCLK1 may be provided from a clock generator located inside or outside the encryption/decryption circuit 1350. The clock generator may be re-designed to generate the changed clock signal CCLK1 having a duty ratio or a duty cycle different from that of the clock signal CLK1. In example embodiments, to adaptively control the operation performance of the encryption/decryption circuit 1350, the duty ratio or duty cycle of the changed clock signal CCLK1 may be programmable or adjustable.

In example embodiments, the changed clock signal CCLK1 may be implemented without re-designing the clock generator. Such example embodiments will be described with reference to FIGS. 15 to 19.

Figure 15:
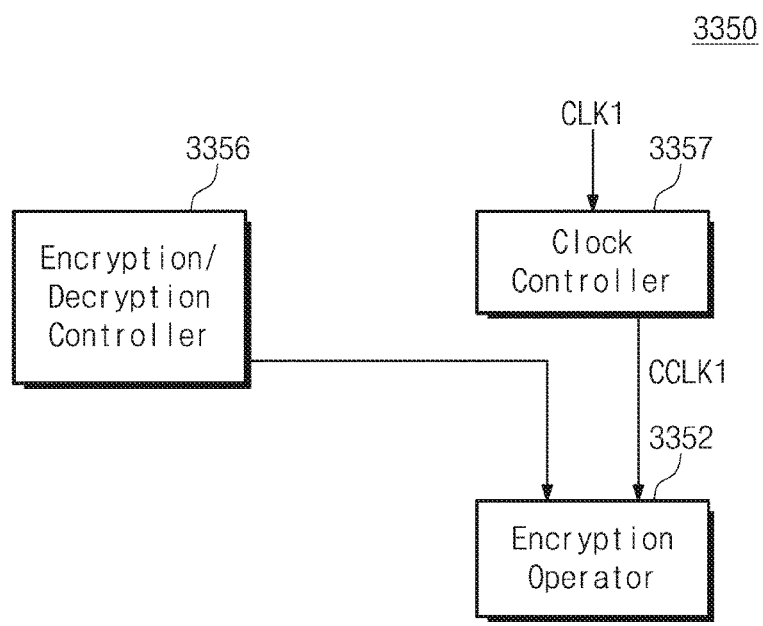
FIG. 15 is a block diagram illustrating an example configuration of the encryption/decryption circuit of FIG. 2.

FIG. 15 is a block diagram illustrating an example configuration of the encryption/decryption circuit of FIG. 2. In example embodiments, an encryption/decryption circuit 3350 may include an encryption operator 3352, an encryption/decryption controller 3356, and a clock controller 3357.

Configurations and operations of the encryption operator 3352 and the encryption/decryption controller 3356 may include configurations and operations of the encryption operator 1352 and the encryption/decryption controller 1356 of FIG. 2, respectively. FIG. 15 illustrates only an example configuration of the encryption/decryption circuit 3350, and the encryption/decryption circuit 3350 may further include components included in the encryption/decryption circuit 1350 of FIG. 2. For brevity, redundant descriptions associated with the encryption/decryption circuit 3350, the encryption operator 3352, and the encryption/decryption controller 3356 will be omitted below.

The clock controller 3357 may receive a first clock signal (e.g., the clock signal CLK1). The first clock signal may correspond to the clock signal CLK1 described with reference to FIGS. 6 and 7. A length of a time period in which the clock signal CLK1 has a first logic value (e.g., logic "0") is the same as a length of a time period in which the clock signal CLK1 has a second logic value (e.g., logic "1"). Accordingly, the clock signal CLK1 may be understood as a normal clock signal herein.

The clock controller 3357 may receive a second clock signal (e.g., the changed clock signal CCLK1) based on the first clock signal. The second clock signal may correspond to the changed clock signal CCLK1 described with reference to FIG. 14. In example embodiments, the changed clock signal CCLK1 may not be generated by a re-designed clock generator, but it may be generated by the clock generator 3357 from the clock signal CLK1.

The changed clock signal CCLK1 may be provided to the encryption operator 3352. The logic gates of the encryption operator 3352 may operate based on the changed clock signal CCLK1 instead of the clock signal CLK1. As illustrated in FIG. 14, for the changed clock signal CCLK1, a length of the operation period may be longer than a length of the initialization period. Accordingly, the operation performance of the encryption operator 3352 may be improved.

In example embodiments, all or a part of the clock controller 3357 may be included in the encryption/decryption controller 3356. In some other example embodiments, all or a part of the clock controller 3357 may be provided outside the encryption/decryption circuit 3350. The example configuration of FIG. 15 is provided to facilitate better understanding without limiting the example embodiments. The configuration of the encryption/decryption circuit 3350 may be variously changed or modified.

In example embodiments, the encryption/decryption circuit 3350 may employ the clock controller 3357 together with the period controller 2357 of FIG. 7. For example, the period controller 2357 may receive the changed clock signal CCLK1 from the clock controller 3357, instead of the clock signal CLK1. In this example, the period controller 2357 may generate the activation signal ACT1 based on the control value EC (and/or the inverted value "~EC" of the control value EC) and the changed clock signal CCLK1. Such the activation signal ACT1 may have a constant logic value while the encryption operation and the decryption operation are not performed, and may also correspond to the changed clock signal CCLK1 while the encryption operation and/or the decryption operation is performed.

FIG. 15 illustrate that the changed clock signal CCLK1 is provided to the encryption operator 3352. In example embodiments, the decryption operator 1353 of FIG. 2 may receive the changed clock signal CCLK1, instead of the clock signal CLK2. Alternatively, the decryption operator 1353 may receive the activation signal ACT2 generated based on the changed clock signal CCLK1 and the control value DC of FIG. 12.

In example embodiments, the S-Box 1355 of FIG. 2 may receive the changed clock signal CCLK1, instead of the clock signal CLK3. Alternatively, the S-Box 1355 may receive the activation signal ACT3 generated based on the changed clock signal CCLK1 and the control value SC of FIG. 13. The example embodiments are not limited to the above descriptions and may be variously changed or modified to employ an activation signal or a changed clock signal instead of a normal clock signal.

Figure 16:
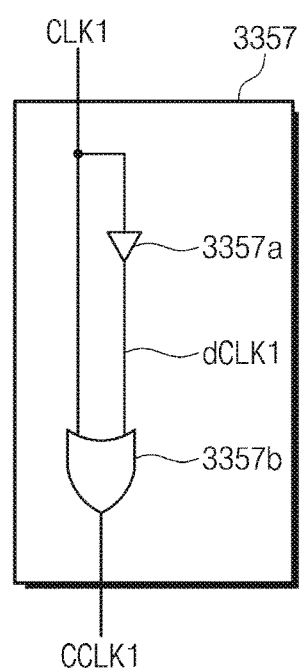
FIG. 16 is a block diagram illustrating an example configuration of a clock controller of FIG. 15.
Figure 17:
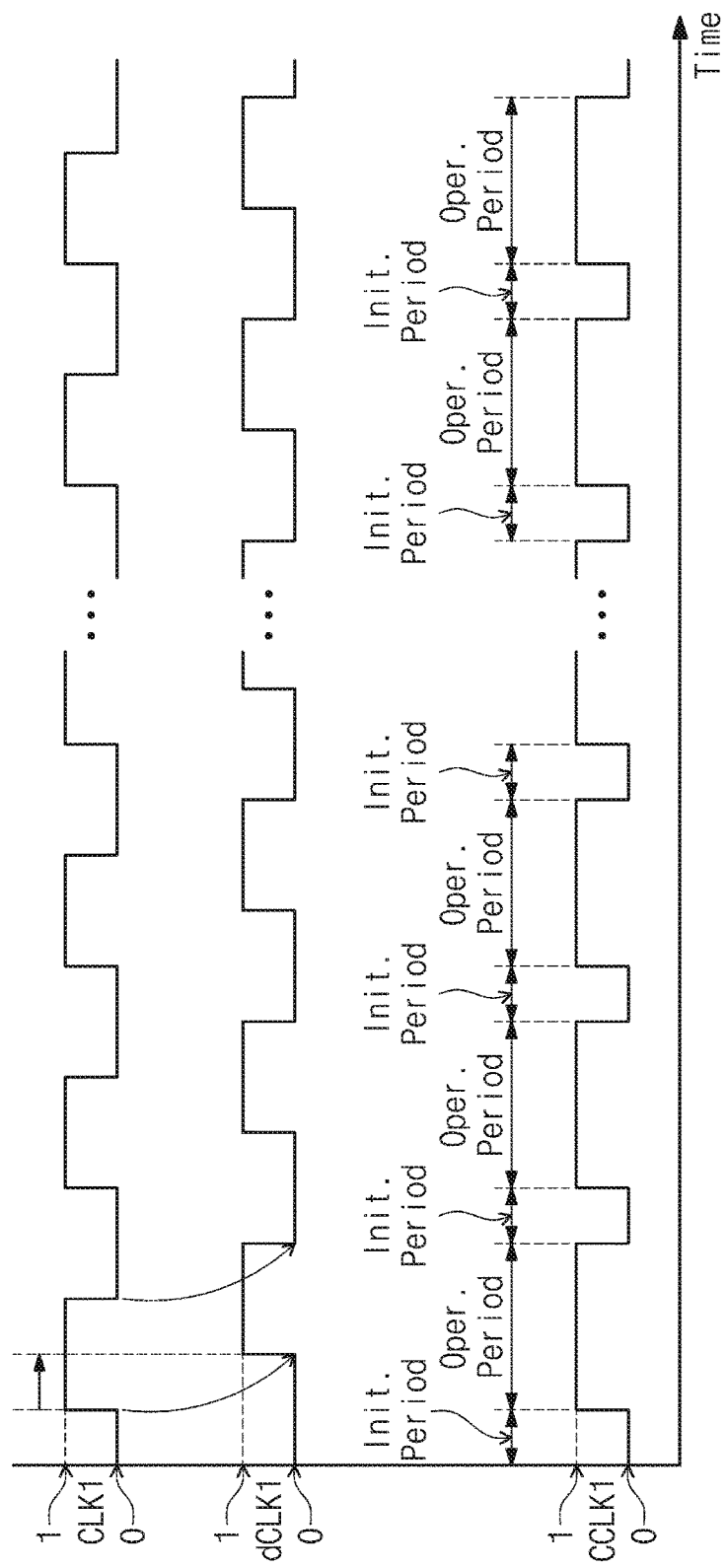
FIG. 17 is a timing diagram for describing time periods of an example encryption/decryption operation performed in the encryption/decryption circuit of FIG. 15 that includes the clock controller of FIG. 16.

FIG. 16 is a block diagram illustrating an example configuration of a clock controller of FIG. 15. FIG. 17 is a timing diagram for describing time periods of an example encryption/decryption operation performed in the encryption/decryption circuit of FIG. 15 that includes the clock controller of FIG. 16.

Referring to FIG. 16, the clock controller 3357 may include a buffer 3357a and a combinational logic gate 3357b. The clock controller 3357 may receive the clock signal CLK1. The buffer 3357a may delay the clock signal CLK1. Accordingly, the buffer 3357a may output a delayed clock signal dCLK1.

FIG. 17 illustrates the clock signal CLK1 and the delayed clock signal dCLK1. The buffer 3357a may delay the clock signal CLK1 to output the delayed clock signal dCLK1. A length of a time period in which the delayed clock signal dCLK1 has a value of logic "0" may be the same as a length of a time period in which the clock signal CLK1 has a value of logic "0". A length of a time period in which the delayed clock signal dCLK1 has a value of logic "1" may be the same as a length of a time period in which the clock signal CLK1 has a value of logic "1".

Returning to FIG. 16, the combinational logic gate 3357b may receive the clock signal CLK1 and the delayed clock signal dCLK1. The combinational logic gate 2357b may generate the changed clock signal CCLK1 based on the clock signal CLK1 and the delayed clock signal dCLK1. For example, the combinational logic gate 3357b may perform a logical OR operation on the clock signal CLK1 and the delayed clock signal dCLK1.

Returning to FIG. 17, when both the clock signal CLK1 and the delayed clock signal dCLK1 have a value of logic "0", the changed clock signal CCLK1 may have a value of logic "0". On the other hand, when either one or both of the clock signal CLK1 and the delayed clock signal dCLK1 have a value of logic "1", the changed clock signal CCLK1 may have a value of logic "1". Accordingly, a length of the initialization period in which the changed clock signal CCLK1 has a value of logic "0" is shorter than a length of the operation period in which the changed clock signal CCLK1 has a value of logic "1". The changed clock signal CCLK1 may make it possible to improve the operation performance.

When a delay of the clock signal CLK1 is excessively long, a length of the initialization period of the changed clock signal CCLK1 may become longer than a length of the operation period of the changed clock signal CCLK1. When a delay of the clock signal CLK1 is excessively short, logic values of the changed clock signal CCLK1 may not alternate. Accordingly, the buffer 3357a may appropriately delay the clock signal CLK1 such that a length of the initialization period of the changed clock signal CCLK1 becomes shorter than a length of the operation period of the changed clock signal CCLK1. In some cases, the delay of the buffer 3357a may be programmable or adjustable.

Figure 18:
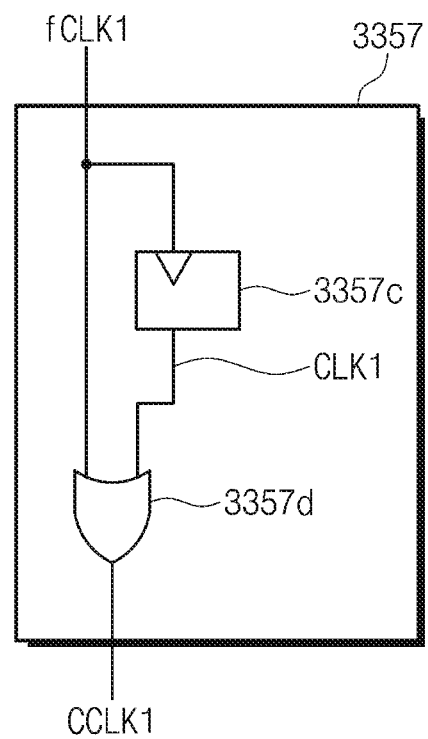
FIG. 18 is a block diagram illustrating an example configuration of the clock controller of FIG. 15.
Figure 19:
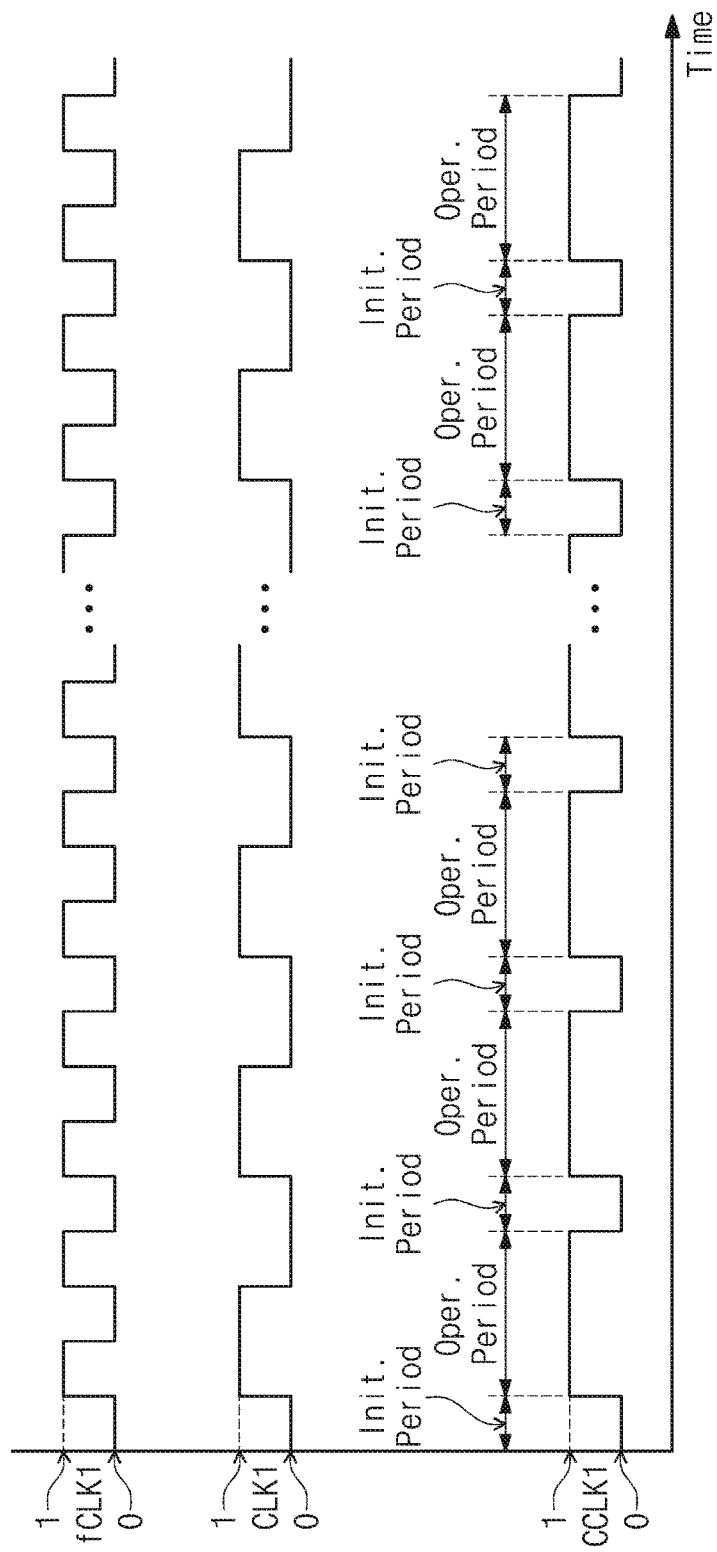
FIG. 19 is a timing diagram for describing time periods of an example encryption/decryption operation performed in the encryption/decryption circuit of FIG. 15 that includes the clock controller of FIG. 18.

FIG. 18 is a block diagram illustrating an example configuration of the clock controller of FIG. 15. FIG. 19 is a timing diagram for describing time periods of an example encryption/decryption operation performed in the encryption/decryption circuit of FIG. 15 that includes the clock controller of FIG. 18.

Referring to FIG. 18, the clock controller 3357 may include a divider 3357c and a combinational logic gate 3357d. The clock controller 3357 may receive a fast clock signal fCLK1. The divider 3357c may divide the fast clock signal fCLK1. Accordingly, the divider 3357c may output the clock signal CLK1. For example, the divider 3357c may include a logic circuit such as a counter register, a shift register, or the like.

FIG. 19 illustrates the fast clock signal fCLK1 and the clock signal CLK1. The clock signal CLK1 may have a frequency that is used in an encryption/decryption circuit to perform the encryption operation and/or the decryption operation. Accordingly, the clock signal CLK1 may be understood as a normal clock signal. A frequency of the fast clock signal fCLK1 may be higher than a frequency of the clock signal CLK1. In the example embodiment of FIGS. 18 and 19, a clock generator that outputs the fast clock signal fCLK1 may be provided to generate the clock signal CLK1.

The divider 3357c may divide the fast clock signal fCLK1 and may output the divided clock signal CLK1. A length of a time period in which the divided clock signal CLK1 has a value of logic "0" may be different from a length of a time period in which the fast clock signal fCLK1 has a value of logic "0". A length of a time period in which the divided clock signal CLK1 has a value of logic "1" may be different from a length of a time period in which the fast clock signal fCLK1 has a value of logic "1".

Returning to FIG. 18, the combinational logic gate 3357d may receive the fast clock signal fCLK1 and the divided clock signal CLK1. The combinational logic gate 3357d may generate the changed clock signal CCLK1 based on the fast clock signal fCLK1 and the divided clock signal CLK1. For example, the combinational logic gate 3357d may perform a logical OR operation on the fast clock signal fCLK1 and the divided clock signal CLK1.

Returning to FIG. 19, when both the fast clock signal fCLK1 and the divided clock signal CLK1 have a value of logic "0", the changed clock signal CCLK1 may have a value of logic "0". On the other hand, when either one or both of the fast clock signal fCLK1 and the divided clock signal CLK1 have a value of logic "1", the changed clock signal CCLK1 may have a value of logic "1". Accordingly, a length of the initialization period in which the changed clock signal CCLK1 has a value of logic "0" is shorter than a length of the operation period in which the changed clock signal CCLK1 has a value of logic "1". The changed clock signal CCLK1 may make it possible to improve the operation performance.

Figure 20:
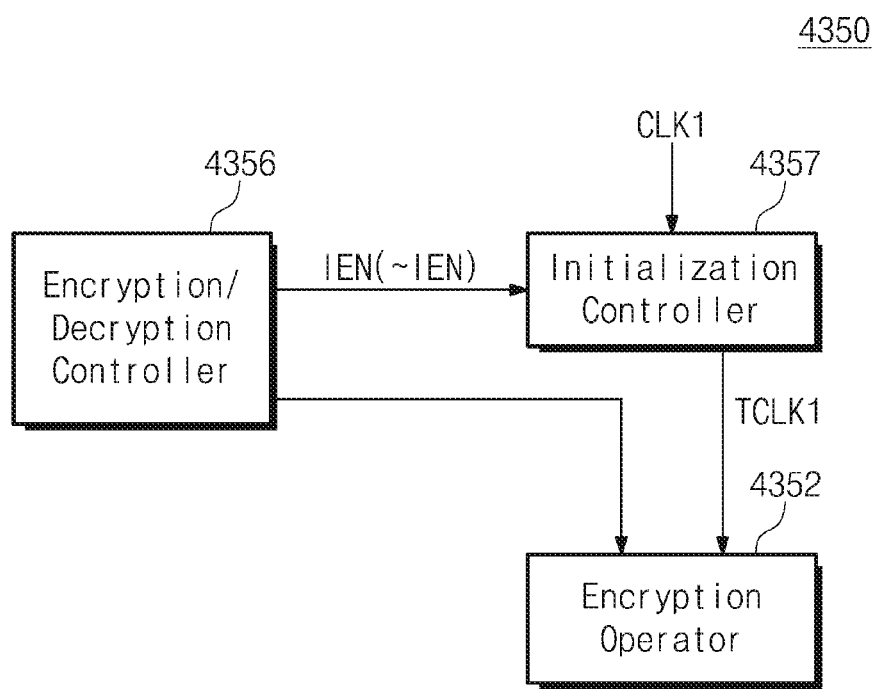
FIG. 20 is a block diagram illustrating an example configuration included in the encryption/decryption circuit of FIG. 2.

FIG. 20 is a block diagram illustrating an example configuration included in the encryption/decryption circuit of FIG. 2. In example embodiments, an encryption/decryption circuit 4350 may include an encryption operator 4352, an encryption/decryption controller 4356, and an initialization controller 4357.

Configurations and operations of the encryption operator 4352 and the encryption/decryption controller 4356 may include configurations and operations of the encryption operator 1352 and the encryption/decryption controller 1356 of FIG. 2, respectively. FIG. 20 illustrates an example configuration of the encryption/decryption circuit 4350, and the encryption/decryption circuit 4350 may further include components included in the encryption/decryption circuit 1350 of FIG. 2. For brevity, redundant descriptions associated with the encryption/decryption circuit 4350, the encryption operator 4352, and the encryption/decryption controller 4356 will be omitted below.

The encryption/decryption controller 4356 may output a control value IEN and/or an inverted value "~IEN" of the control value IEN. The control value IEN may be associated with a speed mode of the encryption operation. For example, the control value IEN may indicate whether the encryption operation of the encryption operator 4352 is performed in a low-speed mode or a high-speed mode.

As described with reference to FIGS. 6 and 14, when a time period (e.g., the initialization period) when the clock signal CLK1 has a first logic value (e.g., logic "0") becomes longer, the operation performance of the encryption operator 4352 may be degraded. When the initialization period is completely omitted, the optimization performance of the encryption operator 4352 may be maximized.

The control value IEN may have an influence on occurrence and omission of the initialization period. For example, when the control value IEN indicates that the encryption operation is performed in the high-speed mode, the initialization period may be omitted, and thus only the operation period may occur. Accordingly, the operation performance of the encryption operator 4352 may be maximized in the high-speed mode. On the other hand, when the control value IEN indicates that the encryption operation is performed in the low-speed mode, the initialization period and the operation period may occur in turn (e.g., alternately).

The control value IEN may be provided from a user of the computing device 1000 of FIG. 1. Alternatively, the control value IEN may be provided from the processor device 1100 and/or the memory controller 1330 of FIG. 1, depending on a policy of the computing device 1000. The control value IEN may have one of logic values, which respectively indicate the low-speed mode and the high-speed mode, to be suitable to a demand for the performance of the encryption operation and/or the decryption operation.

For example, the control value IEN may be stored in the register 1356a of FIG. 2. The encryption/decryption controller 4356 may manage the encryption operation of the encryption operator 4352 based on the control value IEN stored in the register 1356a, and the initialization controller 4357 may receive the control value IEN from the register 1356a.

In some cases, the initialization controller 4357 may receive the inverted value "~IEN" of the control value IEN together with the control value IEN or instead of the control value IEN. In addition, the initialization controller 4357 may receive the clock signal CLK1. The initialization controller 4357 may generate a controlled clock signal TCLK1 based on the control value IEN (and/or the inverted value "~IEN" of the control value IEN) and the clock signal CLK1.

The encryption operator 4352 may not directly receive the clock signal CLK1, but it may operate based on the controlled clock signal TCLK1. For example, the encryption operator 4352 may perform the encryption operation based on the controlled clock signal TCLK1.

When the control value IEN indicates that the encryption operation is performed in the low-speed mode, the controlled clock signal TCLK1 may alternately have a first logic value (e.g., logic "0") and a second logic value (e.g., logic "1"), like the clock signal CLK1. Accordingly, the initialization period and the operation period may alternate.

On the other hand, when the control value IEN indicates that the encryption operation is performed in the high-speed mode, a value of the controlled clock signal TCLK1 may be maintained at the second logic value. Accordingly, the encryption operator 4352 may consistently perform the encryption operation in the operation period without the initialization period, and thus the operation performance may be maximized. The controlled clock signal TCLK1 will be described in detail with reference to FIG. 21.

In example embodiments, all or a part of the initialization controller 4357 may be included in the encryption/decryption controller 4356. In some other example embodiments, all or a part of the initialization controller 4357 may be provided outside the encryption/decryption circuit 4350. The example configuration of FIG. 20 is provided to facilitate better understanding without limiting the example embodiments. The configuration of the encryption/decryption circuit 4350 may be variously changed or modified.

In example embodiments, the encryption/decryption circuit 4350 may employ the initialization controller 4357 together with the period controller 2357 of FIG. 7. For example, the period controller 2357 may receive the controlled clock signal TCLK1 from the initialization controller 4357 instead of the clock signal CLK1. In this example, the period controller 2357 may generate the activation signal ACT1 based on the control value EC (and/or the inverted value "~EC" of the control value EC) and the controlled clock signal TCLK1. Such the activation signal ACT1 may have a constant logic value while the encryption operation and the decryption operation are not performed, and may enable one of the low-speed mode and the high-speed mode in which the encryption operation and/or the decryption operation is performed.

In example embodiments, the encryption/decryption circuit 4350 may employ the initialization controller 4357 together with the clock controller 3357 of FIG. 15. For example, the clock controller 3357 may receive the controlled clock signal TCLK1 from the initialization controller 4357 instead of the clock signal CLK1. In this example, the controlled clock signal TCLK1 may enable one of the low-speed mode and the high-speed mode. In addition, in the low-speed mode, a length of the initialization period in which the controlled clock signal TCLK1 has a first logic value (e.g., logic "0") may be shorter than a length of the operation period in which the controlled clock signal TCLK1 has a second logic value (e.g., logic "1").

FIG. 20 illustrates that the controlled clock signal TCLK1 is provided to the encryption operator 4352. In example embodiments, the decryption operator 1353 of FIG. 2 may receive the controlled clock signal TCLK1, instead of the clock signal CLK2. Alternatively, the decryption operator 1353 may receive the activation signal ACT2 generated based on the controlled clock signal TCLK1 and the control value DC of FIG. 12.

In example embodiments, the S-Box 1355 of FIG. 2 may receive the controlled clock signal TCLK1, instead of the clock signal CLK3. Alternatively, the S-Box 1355 may receive the activation signal ACT3 generated based on the controlled clock signal TCLK1 and the control value SC of FIG. 13. The example embodiments are not limited to the above descriptions and may be variously changed or modified to employ an activation signal or a controlled clock signal instead of a normal clock signal.

Figure 21:
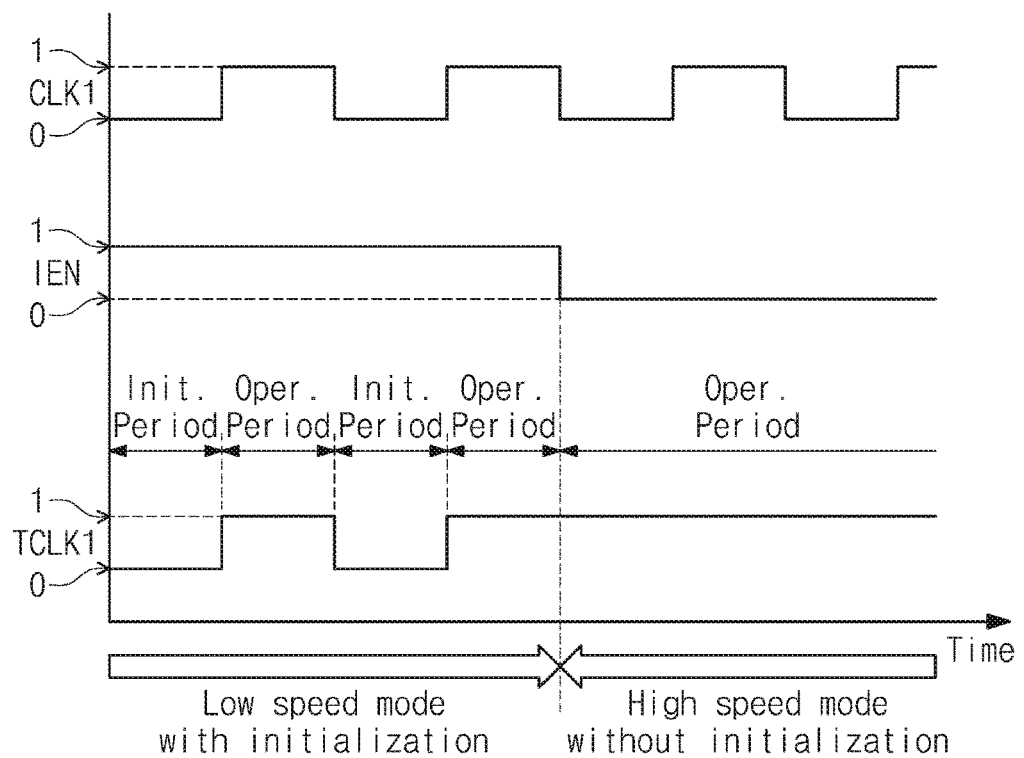
FIG. 21 is a timing diagram for describing time periods of an example encryption/decryption operation performed in the encryption/decryption circuit that includes an initialization controller of FIG. 20.

FIG. 21 is a timing diagram for describing time periods of an example encryption/decryption operation performed in the encryption/decryption circuit that includes an initialization controller of FIG. 20.

For example, the control value IEN having a second logic value (e.g., logic "0") may indicate that the encryption operation and/or the decryption operation is performed in the low-speed mode. For example, the control value IEN having a first logic value (e.g., logic "1") may indicate that the encryption operation and/or the decryption operation is performed in the high-speed mode. However, the example embodiments are not limited thereto. For example, a logic value corresponding to the low-speed mode and a logic value corresponding to the high-speed mode may be interchangeable.

While the control value IEN has a value of logic "1", the encryption/decryption circuit 4350 may perform the encryption operation and/or the decryption operation in the low-speed mode. In the low-speed mode, the controlled clock signal TCLK1 may alternately have a value of logic "0" and a value of logic "1" to correspond the clock signal CLK1. Accordingly, logic gates of the encryption/decryption circuit 4350 may be reset in the initialization period, and may perform the encryption operation and/or the decryption operation in the operation period.

While the control value IEN has a value of logic "0", the encryption/decryption circuit 4350 may perform the encryption operation and/or the decryption operation in the high-speed mode. In the high-speed mode, a value of the controlled clock signal TCLK1 may be maintained at a value of logic "1". With the above description, the encryption/decryption circuit 4350 may consistently perform the encryption operation in the operation period without the initialization period, and thus the operation performance may be maximized in the high-speed mode.

Figure 22A:
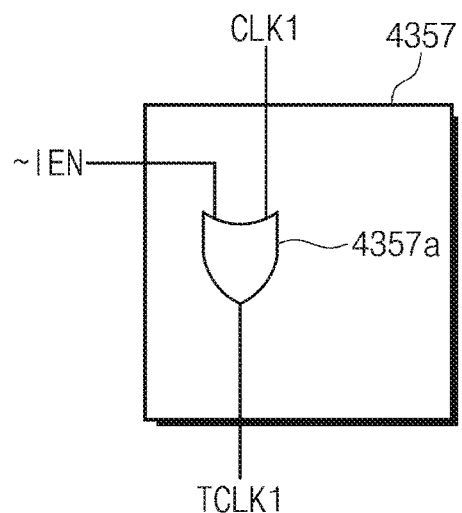
FIGS. 22A and 22B are block diagrams illustrating example configurations of the initialization controller of FIG. 20 with regard to the timing diagram of FIG. 21.
Figure 22B:
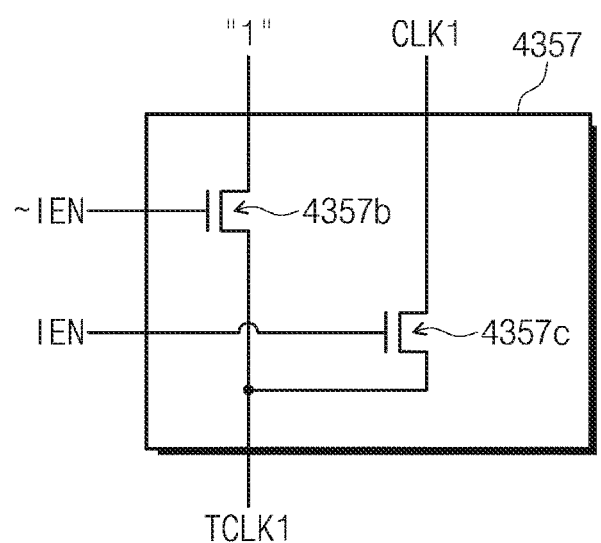

FIGS. 22A and 22B are block diagrams illustrating example configurations of the initialization controller of FIG. 20 with regard to the timing diagram of FIG. 21.

Referring to FIG. 22A, the initialization controller 4357 may include a combinational logic gate 4357a. The combinational logic gate 4357a may combine the clock signal CLK1 and the inverted value "~IEN" of the control value IEN to generate the controlled clock signal TCLK1. For example, the combinational logic gate 4357a may perform a logical OR operation on the clock signal CLK1 and the inverted value "~IEN" of the control value IEN.

In an example of FIG. 22A, when the control value IEN indicates the low-speed mode (e.g., when the control value IEN has a value of logic "1"), the combinational logic gate 4357a may generate the controlled clock signal TCLK1 corresponding to the clock signal CLK1. On the other hand, when the control value IEN indicates the high-speed mode (e.g., when the control value IEN has a value of logic "0"), the combinational logic gate 4357a may generate the controlled clock signal TCLK1 having a value of logic "1".

Referring to FIG. 22B, the initialization controller 4357 may include transistors 4357b and 4357c. The transistor 4357b may transfer a value of logic "1" as the controlled clock signal TCLK1 in response to the inverted value "~IEN" of the control value IEN. The transistor 4357c may transfer the clock signal CLK1 as the controlled clock signal TCLK1 in response to the control value IEN.

In an example of FIG. 22B, when the control value IEN indicates the low-speed mode (e.g., the control value IEN has a value of logic "1"), the transistor 4357c may transfer the controlled clock signal TCLK1 corresponding to the clock signal CLK1. On the other hand, when the control value IEN indicates the high-speed mode (e.g., the control value IEN has a value of logic "0"), the transistor 4357b may generate the controlled clock signal TCLK1 having a value of logic "1".

When the initialization controller 4357 employs the configuration of FIG. 22A or 22B, the initialization controller 4357 may generate the controlled clock signal TCLK1 described with reference to FIG. 21. In this case, in the high-speed mode, the encryption/decryption circuit 4350 may consistently perform the encryption operation in the operation period without the initialization period. Accordingly, the operation performance may be maximized in the high-speed mode.

Figure 23:
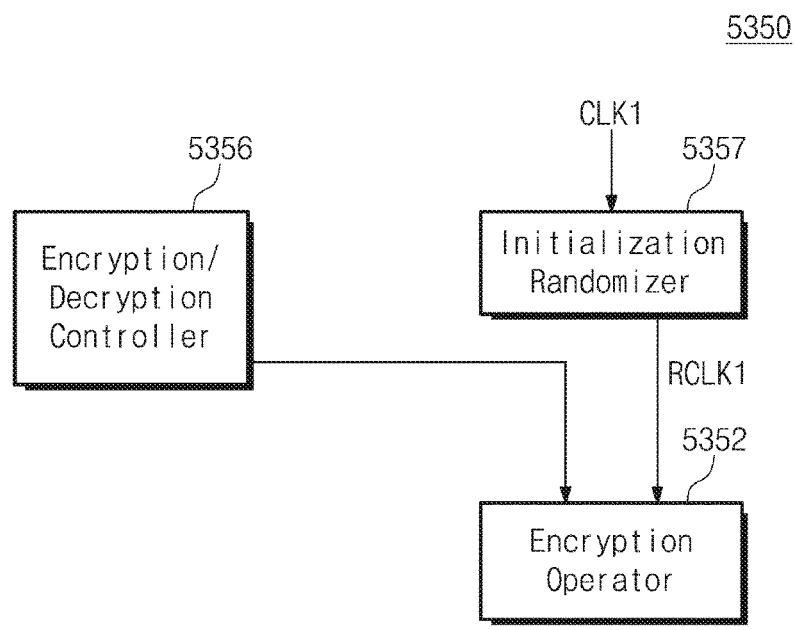
FIG. 23 is a block diagram illustrating an example configuration included in the encryption/decryption circuit of FIG. 2.
Figure 24:
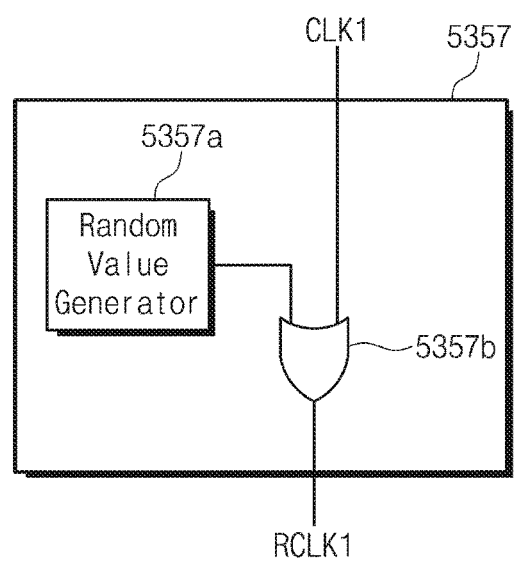
FIG. 24 is a block diagram illustrating an example configuration of an initialization randomizer of FIG. 23.

FIG. 23 is a block diagram illustrating an example configuration included in the encryption/decryption circuit of FIG. 2. FIG. 24 is a block diagram illustrating an example configuration of an initialization randomizer of FIG. 23.

Referring to FIG. 23, in example embodiments, an encryption/decryption circuit 5350 may include an encryption operator 5352, an encryption/decryption controller 5356, and an initialization randomizer 5357. Referring to FIG. 24, in example embodiments, the initialization randomizer 5357 may include a random value generator 5357a and a combinational logic gate 5357b.

Configurations and operations of the encryption operator 5352 and the encryption/decryption controller 5356 may include configurations and operations of the encryption operator 1352 and the encryption/decryption controller 1356 of FIG. 2, respectively. FIGS. 23 and 24 illustrate only example configurations of the encryption/decryption circuit 5350, and the encryption/decryption circuit 5350 may further include components included in the encryption/decryption circuit 1350 of FIG. 2. For brevity, redundant descriptions associated with the encryption/decryption circuit 5350, the encryption operator 5352, and the encryption/decryption controller 5356 will be omitted below.

For example, when the clock signal CLK1 regularly has a first logic value (e.g., logic "0") and a second logic value (e.g., logic "1") in turn, a time point when the initialization period occurs and a time point when the operation period occurs may be predicted.

When the initialization period is controlled in such a way that the initialization period occurs randomly or does not occur randomly, it may be difficult to predict a time point when the initialization period occurs and a time point when the operation period occurs. This is because, when the initialization period occurs randomly or does not occur randomly, the operation period in which the encryption operation and/or the decryption operation are performed may be randomly variable.

Accordingly, when the initialization period occurs randomly or does not occur randomly, it may be difficult for the attacker to align a time point when the encryption operation and/or the decryption operation, which the attacker intends to attack, starts. As a result, the side-channel analysis attack becomes difficult, the security level may be improved.

Referring to FIG. 23, the initialization randomizer 5357 may receive the clock signal CLK1. The clock signal CLK1 may be a normal clock signal that regularly has a first logic value (e.g., logic "0" and a second logic value (e.g., logic "1") in turn.

The initialization randomizer 5357 may generate a randomized clock signal RCLK1 based on the clock signal CLK1. The randomized clock signal RCLK1 may not regularly have a value of logic "0" and a value of logic "1" in turn, but it may randomly have or may not have a value of logic "0".

Referring to FIG. 24, the random value generator 5357a may randomly generate a value of logic "0" and a value of logic "1". The random value generator 5357a may operate by employing one or more of various randomization algorithms and various simulation techniques. Because the randomization algorithms and the simulation techniques may be readily understood by the ordinary skilled in the art, detailed descriptions associated with a method of randomly generating a value of logic "0" and a value of logic "1" based on a seed value will be omitted below.

The combinational logic gate 5357b may receive a random value and the clock signal CLK1. The random value may be provided from the random value generator 5357a. The random value may randomly have a value of logic "0" and a value of logic "1".

The combinational logic gate 5357b may generate the randomized clock signal RCLK1 based on the random value and the clock signal CLK1. To this end, the combinational logic gate 5357b may perform a logical operation on the random value and the clock signal CLK1. For example, the combinational logic gate 5357b may generate the randomized clock signal RCLK1 by performing a logical OR operation on the random value and the clock signal CLK1.

Referring to FIG. 23, the encryption operator 5352 may not directly receive the clock signal CLK1, but it may operate based on the randomized clock signal RCLK1. For example, the encryption operator 5352 may perform the encryption operation based on the randomized clock signal RCLK1.

For example, when the random value generator 5357a generates the random value having a value of logic "0", the randomized clock signal RCLK1 may alternately have a value of logic "0" and a value of logic "1" to correspond the clock signal CLK1. Accordingly, the initialization period and the operation period may alternate.

On the other hand, when the random value generator 5357a generates the random value having a value of logic "1", the randomized clock signal RCLK1 may have a value of logic "1" regardless of the alternation of the clock signal CLK1. Accordingly, only the operation period may occur without the initialization period.

In such a manner, when the random value has a value of logic "0" and a value of logic "1" randomly, the initialization period may randomly occur or not occur. When the occurrence of the initialization period is randomized, it may be difficult to detect a time point when the encryption operation and/or the decryption operation start. Accordingly, the security level may be improved. To increase a randomization level of the random value, a seed value used to generate the random value may be programmable or adjustable.

In example embodiments, all or a part of the initialization randomizer 5357 may be included in the encryption/decryption controller 5356. In some other example embodiments, all or a part of the initialization randomizer 5357 may be provided outside the encryption/decryption circuit 5350. The initialization randomizer 5357 may include various configurations to combine a clock signal and a random value. The example configurations of FIGS. 23 and 24 are provided to facilitate better understanding without limiting the example embodiments. The configuration of the encryption/decryption circuit 5350 may be variously changed or modified.

In example embodiments, the encryption/decryption circuit 5350 may employ the initialization randomizer 5357 together with the period controller 2357 of FIG. 7. For example, the period controller 2357 may receive the randomized clock signal RCLK1 from the initialization randomizer 5357 instead of the clock signal CLK1. In this example, the period controller 2357 may generate the activation signal ACT1 based on the control value EC (and/or the inverted value "~EC" of the control value EC) and the randomized clock signal RCLK1.

In example embodiments, the encryption/decryption circuit 5350 may employ the initialization randomizer 5357 together with the clock controller 3357 of FIG. 15. In example embodiments, the encryption/decryption circuit 5350 may employ the initialization randomizer 5357 together with the initialization controller 4357 of FIG. 20. For example, each of the clock controller 3357 and the initialization controller 4357 may receive the randomized clock signal RCLK1 from the initialization randomizer 5357 instead of the clock signal CLK1.

FIG. 23 illustrates that the randomized clock signal RCLK1 is provided to the encryption operator 5352. In example embodiments, the decryption operator 1353 of FIG. 2 may receive the randomized clock signal RCLK1, instead of the clock signal CLK2. Alternatively, the decryption operator 1353 may receive the activation signal ACT2 generated based on the randomized clock signal RCLK1 and the control value DC of FIG. 12.

In example embodiments, the S-Box 1355 of FIG. 2 may receive the randomized clock signal RCLK1, instead of the clock signal CLK3. Alternatively, the S-Box 1355 may receive the activation signal ACT3 generated based on the randomized clock signal RCLK1 and the control value SC of FIG. 13. The example embodiments are not limited to the above descriptions, and may be variously changed or modified to employ an activation signal or a randomized clock signal instead of a normal clock signal.

As is traditional in the field of the inventive concepts, example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the example embodiments may be physically separated into two or more interacting and discrete blocks, units and/or modules without departing from the scope of the inventive concepts. Further, the blocks, units and/or modules of the example embodiments may be physically combined into more complex blocks, units and/or modules without departing from the scope of the inventive concepts.

Although detailed example embodiments have been described, it may be understood that numerous other modifications, changes, variations, and substitutions can be devised by those skilled in the art. Moreover, it may be understood that the present disclosure covers various techniques that can be readily modified and embodied based on the above-described example embodiments.

What is claimed is:

1. An electronic circuit comprising:
   an operator comprising a logic circuit configured to receive an activation signal and perform encryption and/or decryption of input data, the logic circuit comprising a plurality of logic gates; and
   a controller configured to generate the activation signal, based on a control signal and a clock signal, to control the operator,
   wherein, if the activation signal has a first value, each of the plurality of logic gates outputs a first logic value, and
   if the activation signal has a second value which is different from the first value, the plurality of logic gates generate outputs depending on the input data, and
   for cycles of the activation signal having the second value, the number of the plurality of logic gates each of which outputs the first logic value and the number of the plurality of logic gates each of which outputs a second logic value are constant, such that an amount of power that is consumed by the logic circuit is constant in each of the cycles of the activation signal having the second value.

2. The electronic circuit of claim 1, wherein the control signal indicates whether the encryption operation is performed or is not performed.

3. The electronic circuit of claim 2, wherein the controller is configured to receive the control signal from an external component or from the operator.

4. The electronic circuit of claim 1, wherein the controller comprises a combinational logic gate configured to combine the clock signal and the control signal to generate the activation signal.

5. The electronic circuit of claim 1, further comprising a buffer configured to store data on which either one or both of the encryption and decryption operations is performed.

6. The electronic circuit of claim 1, wherein the controller is further configured to control the operator to alternately operate in a clock cycle in response to the control signal.

7. The electronic circuit of claim 1, wherein the control signal indicates whether the encryption and decryption operations are performed in a low-speed mode or a high-speed mode, and
   the controller is further configured to control the operator to consistently operate in a clock cycle in the high-speed mode.

8. The electronic circuit of claim 1, wherein a length of a time period in which the clock signal has a deactivation value is shorter than a length of a time period in which the clock signal has an activation value.

9. An electronic circuit comprising:
   an operator comprising a logic circuit configured to receive an activation signal and perform encryption and/or decryption of input data, the logic circuit comprising a plurality of logic gates;
   a controller configured to control the operator by generating the activation signal in response to a combination of a control signal and a clock signal;
   wherein if the activation signal has a value of logic "1", the number of the plurality of logic gates each of which outputs a value of logic "0" and the number of the plurality of logic gates each of which outputs a value of logic "1" are constant, such that an amount of power that is consumed by the logic circuit is constant.

10. The electronic circuit of claim 9, wherein the control signal indicates whether the encryption operation is performed or is not performed.

11. The electronic circuit of claim 10, wherein the controller is configured to receive the control signal from an external component or the operator.

12. The electronic circuit of claim 9, wherein the controller comprises a combinational logic gate configured to combine the control signal and the clock signal to generate the combination of the control signal and the clock signal.

13. The electronic circuit of claim 9, wherein the controller is further configured to control the operator to alternately operate in a clock cycle in response to the control signal.

14. The electronic circuit of claim 9, wherein the control signal indicates whether the encryption and decryption operations are performed in a low-speed mode or a high-speed mode, and
   the controller is further configured to control the operator to consistently operate in a clock cycle in the high-speed mode.

15. The electronic circuit of claim 9, wherein a length of a time period in which the clock signal has a deactivation value is shorter than a length of a time period in which the clock signal has an activation value.

16. An electronic circuit comprising:
an operator comprising a logic circuit configured to perform encryption and/or decryption of input data in response to a clock signal, the logic circuit comprising a plurality of logic gates;
a controller configured to control the operator to operate in a first mode if a control signal has a first logic value, and control the operator to operate in a second mode if the control signal has a second logic value which is different from the first logic value,
wherein if the clock signal has a value of logic "1" and the control signal has the second logic value, the number of the plurality of logic gates each of which outputs a value of logic "0" and the number of the plurality of logic gates each of which outputs a value of logic "1" are constant, such that an amount of power that is consumed by the logic circuit is constant.

17. The electronic circuit of claim 16, wherein the controller is further configured to control the operator to alternately operate in a clock cycle in the second mode.

18. The electronic circuit of claim 16, wherein the controller is further configured to control the operator to consistently operate in a clock cycle in the second mode.

19. The electronic circuit of claim 16, wherein a length of a time period in which the clock signal has a deactivation value is shorter than a length of a time period in which the clock signal has an activation value.

20. The electronic circuit of claim 10, wherein the controller is configured to receive the control signal from an external component or the operator.

\* \* \* \* \*